(12) United States Patent
Urbschat et al.

(10) Patent No.: US 9,213,756 B2
(45) Date of Patent: Dec. 15, 2015

(54) SYSTEM AND METHOD OF USING DYNAMIC VARIANCE NETWORKS

(76) Inventors: Harry Urbschat, Oldenburg (DE); Ralph Meier, Freiburg (DE); Thorsten Wanschura, Oldenburg (DE); Johannes Hausmann, Marseille (FR)

(*) Notice: Subject to any disclaimer, the term of this patent is extended or adjusted under 35 U.S.C. 154(b) by 165 days.

(21) Appl. No.: 12/610,915

(22) Filed: Nov. 2, 2009

(65) Prior Publication Data
US 2011/0106823 A1    May 5, 2011

(51) Int. Cl.
G06F 7/00        (2006.01)
G06F 17/30       (2006.01)
G06K 9/00        (2006.01)
G06K 9/03        (2006.01)
G06K 9/20        (2006.01)

(52) U.S. Cl.
CPC ........ *G06F 17/3061* (2013.01); *G06K 9/00469* (2013.01); *G06K 9/03* (2013.01); *G06K 9/2072* (2013.01); *G06K 2209/01* (2013.01)

(58) Field of Classification Search
CPC ............ G06F 17/3071; G06F 17/3069; G06F 17/2785; G06F 17/3061; G06F 17/30; G06K 9/2072; G06K 2209/01; G06K 9/00469; G06K 9/03
See application file for complete search history.

(56) References Cited

U.S. PATENT DOCUMENTS

| | | | |
|---|---|---|---|
| 4,731,861 A | 3/1988 | Blanton et al. | |
| 4,799,188 A | 1/1989 | Yoshimura | |
| 4,864,501 A | 9/1989 | Kucera et al. | |
| 5,191,525 A | 3/1993 | LeBrun et al. | |
| 5,201,047 A | 4/1993 | Maki et al. | |
| 5,245,672 A | 9/1993 | Wilson et al. | |
| 5,267,165 A | 11/1993 | Sirat | |
| 5,276,870 A | 1/1994 | Shan et al. | |
| 5,278,980 A | 1/1994 | Pedersen et al. | |
| 5,344,132 A | 9/1994 | LeBrun et al. | |
| 5,537,491 A | 7/1996 | Mahoney et al. | |
| 5,546,503 A | 8/1996 | Abe et al. | |
| 5,550,931 A | 8/1996 | Bellegarda et al. | |
| 5,619,709 A | 4/1997 | Caid et al. | |
| 5,649,068 A | 7/1997 | Boser et al. | |
| 5,671,333 A | 9/1997 | Catlett et al. | |

(Continued)

FOREIGN PATENT DOCUMENTS

EP    0 320 266    6/1989
EP    0 572 807    12/1993

(Continued)

OTHER PUBLICATIONS

File History of U.S. Appl. No. 12/191,774.

(Continued)

*Primary Examiner* — Azam Cheema
(74) *Attorney, Agent, or Firm* — DLA Piper LLP US

(57) ABSTRACT

Systems and methods for determining a location of a target in a document. Information compiled from a training document is created, the information comprising a reference and a reference vector tying each reference to the target. The reference is compared to a new reference in a new document to determine if there are any similar references that are the target, wherein similar references are: position similar, or type similar, or both. When the new reference comprises a typo, an optical character recognition (OCR) mistake, or both, the new reference is still determined to be the target because of the new reference's location.

22 Claims, 20 Drawing Sheets

(56) References Cited

U.S. PATENT DOCUMENTS

| | | | |
|---|---|---|---|
| 5,675,710 A | 10/1997 | Lewis | |
| 5,689,620 A | 11/1997 | Kopec et al. | |
| 5,745,889 A | 4/1998 | Burrows | |
| 5,778,362 A | 7/1998 | Deerwester | |
| 5,787,201 A | 7/1998 | Nelson et al. | |
| 5,794,178 A | 8/1998 | Caid et al. | |
| 5,809,476 A | 9/1998 | Ryan | |
| 5,864,855 A | 1/1999 | Ruocco et al. | |
| 5,889,886 A | 3/1999 | Mahoney | |
| 5,918,223 A | 6/1999 | Blum et al. | |
| 5,937,084 A | 8/1999 | Crabtree et al. | |
| 5,956,419 A | 9/1999 | Kopec et al. | |
| 5,987,457 A | 11/1999 | Ballard | |
| 5,999,664 A | 12/1999 | Mahoney | |
| 6,006,221 A | 12/1999 | Liddy et al. | |
| 6,009,196 A | 12/1999 | Mahoney | |
| 6,043,819 A | 3/2000 | LeBrun et al. | |
| 6,047,299 A * | 4/2000 | Kaijima | 715/236 |
| 6,069,978 A | 5/2000 | Peairs | |
| 6,076,088 A | 6/2000 | Paik et al. | |
| 6,101,515 A | 8/2000 | Wical et al. | |
| 6,115,708 A | 9/2000 | Fayyad et al. | |
| 6,161,130 A | 12/2000 | Horvitz et al. | |
| 6,185,576 B1 | 2/2001 | McIntosh | |
| 6,188,010 B1 | 2/2001 | Iwamura | |
| 6,192,360 B1 | 2/2001 | Dumais et al. | |
| 6,212,532 B1 | 4/2001 | Johnson et al. | |
| 6,243,713 B1 | 6/2001 | Nelson et al. | |
| 6,275,610 B1 | 8/2001 | Hall, Jr. et al. | |
| 6,289,334 B1 | 9/2001 | Reiner et al. | |
| 6,324,551 B1 | 11/2001 | Lamping et al. | |
| 6,327,387 B1 | 12/2001 | Naoi et al. | |
| 6,453,315 B1 | 9/2002 | Weissman et al. | |
| 6,477,551 B1 | 11/2002 | Johnson et al. | |
| 6,574,632 B2 | 6/2003 | Fox et al. | |
| 6,611,825 B1 | 8/2003 | Billheimer | |
| 6,622,134 B1 | 9/2003 | Sorkin | |
| 6,629,097 B1 | 9/2003 | Keith | |
| 6,665,668 B1 | 12/2003 | Sugaya et al. | |
| 6,665,841 B1 | 12/2003 | Mahoeny et al. | |
| 6,732,090 B2 | 5/2004 | Shanahan et al. | |
| 6,741,724 B1 | 5/2004 | Bruce et al. | |
| 6,741,959 B1 | 5/2004 | Kaiser | |
| 6,772,164 B2 | 8/2004 | Reinhardt | |
| 6,785,810 B1 | 8/2004 | Lirov | |
| 6,944,340 B1 | 9/2005 | Shah | |
| 6,976,207 B1 | 12/2005 | Rujan et al. | |
| 6,983,345 B2 | 1/2006 | Lapir et al. | |
| 6,990,238 B1 | 1/2006 | Saffer | |
| 7,149,347 B1 | 12/2006 | Wnek | |
| 7,433,997 B2 | 10/2008 | Lapir et al. | |
| 7,440,938 B2 | 10/2008 | Matsubayashi et al. | |
| 7,472,121 B2 * | 12/2008 | Kothari et al. | 1/1 |
| 7,483,570 B1 | 1/2009 | Knight | |
| 7,509,578 B2 | 3/2009 | Rujan et al. | |
| 7,610,281 B2 | 10/2009 | Gandhi et al. | |
| 7,720,721 B1 * | 5/2010 | Goldstein et al. | 705/26.1 |
| 7,805,446 B2 * | 9/2010 | Potok et al. | 707/737 |
| 7,865,018 B2 | 1/2011 | Abdulkader | |
| 7,908,430 B2 | 3/2011 | Lapir et al. | |
| 8,015,198 B2 * | 9/2011 | Rabald et al. | 707/765 |
| 8,051,139 B1 | 11/2011 | Musat | |
| 8,554,852 B2 | 10/2013 | Burnim | |
| 2001/0042083 A1 | 11/2001 | Saito et al. | |
| 2002/0022956 A1 | 2/2002 | Ukrainczyk et al. | |
| 2002/0023085 A1 | 2/2002 | Keith, Jr. | |
| 2002/0129015 A1 | 9/2002 | Caudill et al. | |
| 2002/0133476 A1 | 9/2002 | Reinhardt | |
| 2002/0156760 A1 | 10/2002 | Lawrence et al. | |
| 2002/0156816 A1 | 10/2002 | Kantrowitz et al. | |
| 2003/0099399 A1 | 5/2003 | Zelinski | |
| 2004/0049411 A1 | 3/2004 | Suchard et al. | |
| 2004/0054666 A1 | 3/2004 | Lapir et al. | |
| 2004/0243601 A1 * | 12/2004 | Toshima | 707/100 |
| 2004/0255218 A1 | 12/2004 | Tada et al. | |
| 2005/0021508 A1 | 1/2005 | Matsubayashi et al. | |
| 2005/0160369 A1 | 7/2005 | Balabanovic et al. | |
| 2006/0142993 A1 | 6/2006 | Menendez-Pidal | |
| 2006/0210138 A1 | 9/2006 | Hilton | |
| 2006/0212413 A1 | 9/2006 | Rujan et al. | |
| 2006/0212431 A1 | 9/2006 | Lapir et al. | |
| 2007/0033252 A1 * | 2/2007 | Combest | 709/204 |
| 2007/0091376 A1 | 4/2007 | Calhoon et al. | |
| 2007/0244882 A1 * | 10/2007 | Cha et al. | 707/5 |
| 2007/0288882 A1 * | 12/2007 | Kniffin et al. | 716/20 |
| 2008/0040660 A1 | 2/2008 | Georke et al. | |
| 2008/0126335 A1 | 5/2008 | Gandhi et al. | |
| 2008/0208840 A1 | 8/2008 | Zhang et al. | |
| 2008/0212877 A1 | 9/2008 | Franco | |
| 2008/0252924 A1 | 10/2008 | Gangai | |
| 2009/0193022 A1 | 7/2009 | Lapir et al. | |
| 2009/0198677 A1 | 8/2009 | Sheehy et al. | |
| 2009/0216693 A1 | 8/2009 | Rujan et al. | |
| 2009/0226090 A1 | 9/2009 | Okita | |
| 2009/0228777 A1 | 9/2009 | Henry et al. | |
| 2009/0274374 A1 * | 11/2009 | Hirohata et al. | 382/218 |
| 2009/0307202 A1 | 12/2009 | Rabald et al. | |
| 2010/0325109 A1 | 12/2010 | Bai | |
| 2011/0078098 A1 | 3/2011 | Lapir et al. | |
| 2011/0103688 A1 | 5/2011 | Urbschat et al. | |
| 2011/0103689 A1 | 5/2011 | Urbschat et al. | |
| 2011/0106823 A1 | 5/2011 | Urbschat et al. | |

FOREIGN PATENT DOCUMENTS

| | | |
|---|---|---|
| EP | 0 750 266 | 12/1996 |
| EP | 0809219 | 11/1997 |
| EP | 1049030 | 11/2000 |
| EP | 1 128 278 | 8/2001 |
| EP | 1 182 577 | 2/2002 |
| EP | 1 288 792 | 3/2003 |
| EP | 1 315 096 | 5/2003 |
| GB | 2172130 | 9/1986 |
| JP | 01-277977 | 11/1989 |
| JP | 02-186484 | 7/1990 |
| JP | 04-123283 | 11/1992 |
| JP | 07-271916 | 10/1995 |
| JP | 10-91712 | 4/1998 |
| JP | 11-184894 | 7/1999 |
| JP | 11-184976 | 7/1999 |
| JP | 2000-155803 | 6/2000 |
| JP | 2003-524258 | 8/2003 |
| JP | 2005-038077 | 2/2005 |
| JP | 2009-238217 | 10/2009 |
| WO | WO 88/01411 | 2/1988 |
| WO | WO 89/04013 | 5/1989 |
| WO | WO 91/10969 | 7/1991 |
| WO | WO 98/01808 | 1/1998 |
| WO | WO 98/47081 | 10/1998 |
| WO | WO 01 42984 | 6/2001 |
| WO | WO 01/63467 | 8/2001 |
| WO | WO 02/15045 | 2/2002 |
| WO | WO 03/019524 | 3/2003 |
| WO | WO 03/044691 | 5/2003 |

OTHER PUBLICATIONS

A. Krikelis et al., "Associative Processing and Processors" Computer, US, IEEE Computer Society, Long Beach, CA, US, vol. 27, No. 11, Nov. 1, 1994, pp. 12-17, XP000483129.

International Search Report issued in related International Application No. PCT/EP01/09577, mailed Nov. 5, 2003.

Motonobu Hattori, "Knowledge Processing System Using Mulit-Mode Associate Memory", IEEE, vol. 1, pp. 531-536 (May 4-9, 1998).

International Search Report issued in International Application No. PCT/EP01/01132, mailed May 30, 2001.

H. Saiga at al., "An OCR System for Business Cards", Proc. of the 2nd Int. Conf. on Document Analysis and Recognition, Oct. 20-22, 1993, pp. 802-805, XP002142832.

Junliang Xue et al., "Destination Address Block Location on hand-written Chinese Envelope", Proc. of the 5th Int Conf. on Document

(56) References Cited

OTHER PUBLICATIONS

Analysis and Recognition, Sep. 20-22, 1999, pp. 737-740, XP002142833.
Machine Translation of JP 11-184894.
Simon Berkovich et al., "Organization of Near Matching In Bit Attribute Matrix Applied to Associative Access Methods In Information Retrieval", Pro. Of the 16th IASTED Int. Conf. Applied Informatics, Feb. 23-25 1998, Garmisch-Partenkirchen, Germany.
European Office Action issued in Application No. 01127768.8 mailed Sep. 10, 2008.
European Office Action issued in Application No. 01120429.4 mailed Sep. 16, 2008.
Frietag, "Information extraction from HTML: application of a general machine learning approach", Pro. 15th National Conference on Artificial Intelligence (AAAI-98); Tenth Conference on Innovative Applications of Artificial Intelligence, Proceedings of the Fifteenth National Conference on Artificial Intelligence, Madison, WI, USA pp. 517-523, SP002197239 1998, Menlo Park, CA, USA, AAAI Press/MIT Press, USA ISBN: 0-262-51098-7.
European Office Action issued in Application No. 01120429.4 mailed Jun. 30, 2006.
European Office Action issued in Application No. 01120429.4 mailed Apr. 23, 2004.
E. Appiani et al., "Automatic document classification and indexing in high-volume applications", International Journal on Document Analysis and Recognition, Dec. 2001, Springer-Verlag, Germany, vol. 4, No. 2, pp. 69-83, XP002197240, ISSN: 1433-2833.
A. Ting et al., "Form recognition using linear structure", Pattern Recognition, Pergamon Press Inc., Elmsford, NY, US, vol. 32, No. 4, Apr. 1999, pp. 645-656, XP004157536, ISSN: 0031-3203.
International Search Report issued in International Application PCT/US02/27132 issued Nov. 12, 2002.
"East text search training", Jan. 2000.
European Search Report issued in European Office Action 01120429.4 mailed Jul. 19, 2002.
International Search Report issued in International Application PCT/DE97/01441, mailed Nov. 12, 1997.
Voorheas et al., "Vector expansion in a large collection", NIST Special Publication, US, Gaithersburg, MD pp. 343-351.
M. Marchard et al., "A Convergence Theorem for Sequential Larning in Two-Layer Perceptrons", Europhysics Letters, vol. 11, No. 6, Mar. 15, 1990, pp. 487-492.
F. Aurenhammer, Voronoi Diagrams—"A survey of a fundamental geometric data structure", ACM Computing Surveys, vol. 23, No. 3, Sep. 1991, pp. 345-405.
C. Reyes et al., "A Clustering Technique for Random Data Classification", International Conference on Systems, Man and Cybernetics, IEEE, p. 316-321.
International Search Report issued in PCT/EP00/03097 mailed Sep. 14, 2000.
International Preliminary Examination Report issued in PCT/EP00/03097 mailed Jul. 31, 2001.
Written Opinion issued in PCT/EP00/03097 mailed Apr. 21, 2001.
Japanese Office Action issued in Japanese Application No. 2003-522903, mailed Jul. 29, 2008.
English language translation of Japanese Office Action issued in Japanese Application No. 2003-522903, mailed Jul. 29, 2008.
European Office Action issued in European Application No. 01 905 729.8, mailed Nov. 22, 2007.
Foreign Office Action issued in EP 00117850.8 mailed May 20, 2008.
Foreign Office Action issued in EP 00117850.8 mailed Jul. 20, 2006.
EP Search Report issued in EP 00117850.8 mailed Jun. 12, 2001.
International Notification issued in PCT/EP00/03097 mailed May 5, 2001.
G. Lapir, "Use of Associative Access Method for Information Retrieval System", Proc. 23rd Pittsburg Conf. on Modeling & Simulation, 1992, pp. 951-958.
Witten et al, "Managing Gigabytes" pp. 128-142.
C.J. Date, "An Introduction to Database Systems, Sixth Edition", Addison-Wesley Publishing Company, pp. 52-65 (1995).
International Search Report for PCT/US00/23784 mailed Oct. 26, 2000.
Australian Office Action in Australian application 2002331728 mailed Nov. 16, 2006.
Australian Notice of Acceptance issued in Australian application 2002331728 mailed Feb. 20, 2008.
Foreign Office Action issued in EP 01127768.8 mailed Feb. 5, 2007.
Foreign Office Action issued in EP 01127768.8 mailed Sep. 8, 2005.
Bo-ren Bai et al. "Syllable-based Chinese text/spoken documents retrieval using text/speech queries", Int'l Journal of Pattern Recognition.
Foreign Search Report issued in EP 01127768.8 mailed Sep. 12, 2002.
European Search Report issued in EP 00103810.8, mailed Aug. 1, 2000.
European Office Action issued in EP 00103810.8, mailed May 23, 2002.
International Preliminary Examination Report issued in International Application No. PCT/DE97/01441, mailed Jul. 21, 1998.
European Office Action issued in EP 00926837.6, mailed Nov. 28, 2006.
European Office Action issued in EP 00926837.6, mailed Oct. 11, 2007.
Australian Office Action issued in AU 2001282106, mailed Jul. 18, 2006.
Australian Office Action issued in AU 2001233736, mailed Aug. 26, 2005.
Australian Office Action issued in AU 2001233736, mailed Aug. 23, 2006.
European Office Action issued in EP 97931718.7, mailed Jul. 9, 2001.
European Office Action issued in EP 97931718.7, mailed May 8, 2002.
International Search Report issued in International Application No. PCT/EP98/00932, mailed Jul. 28, 1998.
Richard G. Casey et al., "A Survey of Methods and Strategies in Character Segmentation", IEEE Transactions on Pattern Analysis and machine Intelligence, vol. 18, No. 7, pp. 690-706 (Jul. 1996).
File History of U.S. Appl. No. 11/240,525.
File History of U.S. Appl. No. 09/561,196.
File History of U.S. Appl. No. 11/240,632.
File History of U.S. Appl. No. 10/362,027.
File History of U.S. Appl. No. 12/106,450.
Office Action issued in Canadian Patent Application No. 2,459,182, mailed Oct. 26, 2010.
File History of U.S. Appl. No. 10/208,088.
European Office Action issued in EP 01127768.8, mailed Feb. 17, 2011.
R.M. Lea et al., "An Associative File Store Using Fragments for Run-Time Indexing and Compression", SIGIR'80, Proceedings of the 3rd Annual ACM Conference on Research and Development in Information Retrieval, pp. 280-295 (1980).
M. Koga et al., "Lexical Search Approach for Character-String Recognition", DAS'98, LNCS 1655, pp. 115-129 (1999).
Office Action issued in Canadian Application No. CA 2,419,776, dated Aug. 16, 2011.
Notice of Allowance issued in Canadian Application No. 2,459,182, dated Oct. 28, 2011.
James Wnek, "Learning to Identify Hundreds of Flex-Form Documents", IS&T/SPIE Conference on Document Recognition and Retrieval VI, San Jose, CA, SPIE vol. 3651, pp. 173-182 (Jan. 1999).
International Search Report issued in PCT/IB2010/003252, mailed Jan. 24, 2012.
Written Opinion issued in PCT/IB2010/003252, mailed Jan. 24, 2012.
A. Dengal et al., "Chapter 8:: Techniques for Improving OCR Results", Handbook of Character Recognition and Document Image Analysis, pp. 227-258, Copyright 1997 World Scientific Publishing Company.
Remy Mullot, "Les Documents Ecrits", Jan. 1, 2006, Lavoisier—Hermes Science, pp. 351-355, "Section 7.6.3 Reconnaissance des caracteres speciaux ou endommages".

(56) References Cited

OTHER PUBLICATIONS

L. Solan, "The Language of the Judges", University of Chicago Press, pp. 45-54, Jan. 1, 1993.
File History of U.S. Appl. No. 13/024,086.
English translation of Remy Mullot, "Les Documents Ecrits", Jan. 1, 2006, Lavoisier—Hermes Science, pp. 351-355, "Section 7.6.3 Reconnaissance des caracteres speciaux ou endommages".
Dave, et al., Mining the Peanut Gallery: Opinion Extraction and Semantic Classification of Product Reviews, ACM 1-58113-680-3/03/0005, May 20-24, 2003, pp. 1-10.
Dreier, Blog Fingerprinting: Identifying Anonymous Posts Written by an Author of Interest Using Word and Character Frequency Analysis, Master's Thesis, Naval Postgraduate School, Monterey, California. Sep. 2009, pp. 1-93.
File History of U.S. Appl. No. 12/208,088.
File History of U.S. Appl. No. 12/570,412.
File History of U.S. Appl. No. 13/548,042.
File History of U.S. Appl. No. 13/624,443.
File History of U.S. Appl. No. 10/204,756.
Office Action issued in Canadian Application No. CA 2,776,891, mailed Oct. 22, 2013.
Office Action issued in Canadian Application No. CA 2,796,392, mailed Sep. 26, 2013.
Office Action issued in Canadian Application No. CA 2,796,392, mailed Apr. 30, 2014.
File History of U.S. Appl. No. 12/588,928.
File History of U.S. Appl. No. 12/610,937.
File History of U.S. Appl. No. 13/192,703.
File History of U.S. Appl. No. 13/477,645.
Office Action issued in Japanese Application No. 2012-532203, mailed Jul. 15, 2014.
Office Action issued in Canadian Application No. 2,776,891 dated May 13, 2014.
English language translation of Office Action issued in Japanese Application No. 2012-537459, mailed Jun. 17, 2014.
English language abstract and translation of JP 10-091712 published Apr. 10, 1998.
English language abstract of JP 1-277977 published Nov. 8, 1989.
English language abstract of JP 2-186484 published Jul. 20, 1990.
English language abstract and translation of JP 7-271916 published Oct. 20, 1995.
English language abstract and translation of JP 11-184976 published Jul. 9, 1999.
English language abstract and translation of JP 2000-155803 published Jun. 6, 2000.
U.S. Appl. No. 09/561,196, filed Apr. 27, 2000.
U.S. Appl. No. 10/531,298, filed Apr. 15, 2005.
U.S. Appl. No. 11/429,436, filed May 8, 2006.
U.S. Appl. No. 11/620,628, filed Jan. 5, 2007.
U.S. Appl. No. 11/896,746, filed Sep. 5, 2007.
U.S. Appl. No. 13/024,086, filed Feb. 9, 2011.
U.S. Appl. No. 13/192,703, filed Jul. 28, 2011.
International Search Report issued in PCT/IB2010/003251, mailed may 2, 2011.
Written Opinion issued in PCT/IB2010/003251, mailed May 2, 2011.
International Search Report issued in PCT/IB2010/003250, mailed may 2, 2011.
Written Opinion issued in PCT/IB2010/003250, mailed May 2, 2011.
Suzanne Liebowitz Taylor et al. "Extraction of Data from Preprinted Forms," Machine Vision and Applications, vol. 5, pp. 211-222, Jan. 1992.
International Search Report issued in PCT/IB2010/050087, mailed May 27, 2011.
Written Opinion issued in PCT/IB2010/050087, mailed May 27, 2011.
File History U.S. Appl. No. 12/106,450.
File History U.S. Appl. No. 12/570,412.
File History U.S. Appl. No. 13/024,086.
Partial English language translation of Office Action issued in Japanese Application No. 2012-532203, mailed Jul. 15, 2014.
English language abstract and translation of JP 2003-524258 published Aug. 12, 2003.
Office Action issued in Japanese Application No. JP 2012-537457 dated Apr. 18, 2014.
English language translation of Office Action issued in Japanese Application No. JP 2012-537457 dated Apr. 18, 2014.
English language abstract of JP 2009-238217, published Oct. 15, 2009.
English language abstract and machine translation of JP 2005-038077, published Feb. 10, 2005.
File History U.S. Appl. No. 13/624,443.
G. Salton et al., "A Vector Space Model for Automatic Indexing", Communications of the ACM, vol. 18, No. 11, pp. 613-620, Nov. 1975.
Office Action issued in Australian Application No. 2010311066 dated Oct. 29, 2014.
Suzanne Liebowitz Taylor et al., "Extraction of Data from Preprinted Forms", Machine Vision and Applications, vol. 5, No. 3, pp. 211-222 (1992).
Office Action issued in Australian Application No. 2010311067 dated Oct. 21, 2014.
Office Action issued in Japanese Application No. 2012-537458 mailed Jun. 17, 2014.
English language translation of Office Action issued in Japanese Application No. 2012-537458, mailed Jun. 17, 2014.
Office Action issued in Australian Application No. 2013205566 dated Dec. 9, 2014.
Stephen V. Rice et al., "The Fifth Annual Test of OCR Accuracy", Information Science Research institute, TR-96-01, Apr. 1996 (48 pages).
Thomas A. Nartker et al., "Software Tools and Test Data for Research and Testing of Page-Reading OCR Systems", IS&T/SPIE Symposium on Electronic Imaging Science and Technology, Jan. 2005 (11 pages).
Tim Kam Ho et al., "OCR with No Shape Training", International Conference on Pattern Recognition (2000) (4 pages).
Karen Kukich, "Techniques for Automatically Correcting Words in Text", ACM Computing Surveys, vol. 24, No. 4, pp. 377-439, Dec. 1992.
Atsuhiro Takasu, "An Approximate Multi-Word Matching Algorithm for Robust Document Retrieval", CIKM'06, Nov. 5-11, 2006 (9 pages).
Kenneth Ward Church et al., "Word Association Norms, Mutual Information, and Lexicography", Computational Linguistics, vol. 16, No. 1, pp. 22-29, Mar. 1990.
Anil N. Hirani et al., "Combining Frequency and Spatial Domain Information for Fast Interactive Image Noise Removal", Proceedings of the 23rd Annual Conference on Computer Graphics and interactive Techniques, pp. 269-276 (1996).
Leonid L. Rudin et al., "Nonlinear Total Variation Based Noise Removal Algorithms", Physica D, vol. 60, pp. 259-268 (1992).
Richard Alan Peters, II, "A New Algorithm for Image Noise Reduction Using Mathematical Morphology", IEEE Transactions on Image Processing, vol. 4, No. 3, pp. 554-568, May 1995.
George Nagy, "Twenty Years of Document Image Analysis in PAMI", IEEE Transactions on Pater Analysis and Machine Intelligence, vol. 22, No. 1, pp. 38-62, Jan. 2000.
Stephen V. Rice et al., "Optical Character Recognition: An Illustrated Guide to the Frontier", Kluwer Academic Publishers, Copyright Apr. 1999.
File History U.S. Appl. No. 10/204,756.
File History U.S. Appl. No. 12/588,928.
File History U.S. Appl. No. 12/610,937.
File History U.S. Appl. No. 13/192,703.
File History U.S. Appl. No. 13/477,645.
File History U.S. Appl. No. 13/548,042.
English language translation of Office Action issued in Japanese Application No. 2012-537458 mailed Jun. 17, 2014.
Andreas R. Dengel et al., "smartFIX: A Requirement Driven System for Document Analysis and Understanding", In: D. Lopresti et al., Document Analysis V, Springer, pp. 433-444 (Copyright 2002).

(56) References Cited

OTHER PUBLICATIONS

Bertin Klein et al., "On Benchmarking of Invoice Analysis Systems" DAS 2006, LNCS 3872, pp. 312-323 (2006).

T.A. Bayer et al., "A Generic System for Processing Invoices", 4th Int. Conf. on Document Analysis and Recognition, pp. 740-744 (1997).

D.P. Lopresti et al., "A Fast Technique for Comparing Graph Representations with Applications to Performance Evaluation", Int. Journal on Document Analysis and Recognition (IJDAR), vol. 6, pp. 219-229 (2004).

Takashi Hirano et al., "Field Extraction Method from Existing Forms Transmitted by Facsimile", In Proceedings of the Sixth International Conference on Document Analysis and Recognition (ICDAR), pp. 738-742, Sep. 10-13, 2001.

Donato Malerba et al., "Automated Discovery of Dependencies Between Logical Components in Document Image Understanding", In Proceedings of the Sixth International Conference on Document Analysis and Recognition (ICDAR), Sep. 10-13, 2001 (5 pages).

Frederick Schultz et al., "Seizing the Treasure: Transferring Layout Knowledge in Invoice Analysis", Proceedings of the 10th International Conference on Document Analysis and Recognition (ICDAR) (2009).

"Brainware: Invoice Processing", downloaded from Internet Archive at http://web.archive.org/web/20080512043505/http://www.brainware.com/invoice.php, archived May 12, 2008 (1 page).

"Kofax: Solutions: Invoice Processing", downloaded from Internet Archive at http://web.archive.org/web/20081012062841/http://vvww.kofax.com/solutions/invoice-processing.asp, archived Oct. 12, 2008 (1 page).

"Kofax: Solutions: Kofax White Papers", downloaded from Internet Archive at http://web.archive.org/web/20080928052442/http://vvww.kofax.com/solutions/white-papers.asp, archived Sep. 28, 2008 (2 pages).

\* cited by examiner

FIND AND STORE REFERENCES

310

CREATE REFERENCE VECTOR FOR EACH REFERENCE

315

PERFORM VARIANCE FILTERING TO OBTAIN CONSISTENT REFERENCE VECTORS

320

USE CONSISTENT REFERENCE VECTORS TO CREATE DVN

215

405

COMPARE REFERENCE STRINGS ON NEW DOCUMENT WITH DVN

410

USE REFERENCE VECTORS TO POINT TOWARDS TARGET

415

DETERMINE TARGET

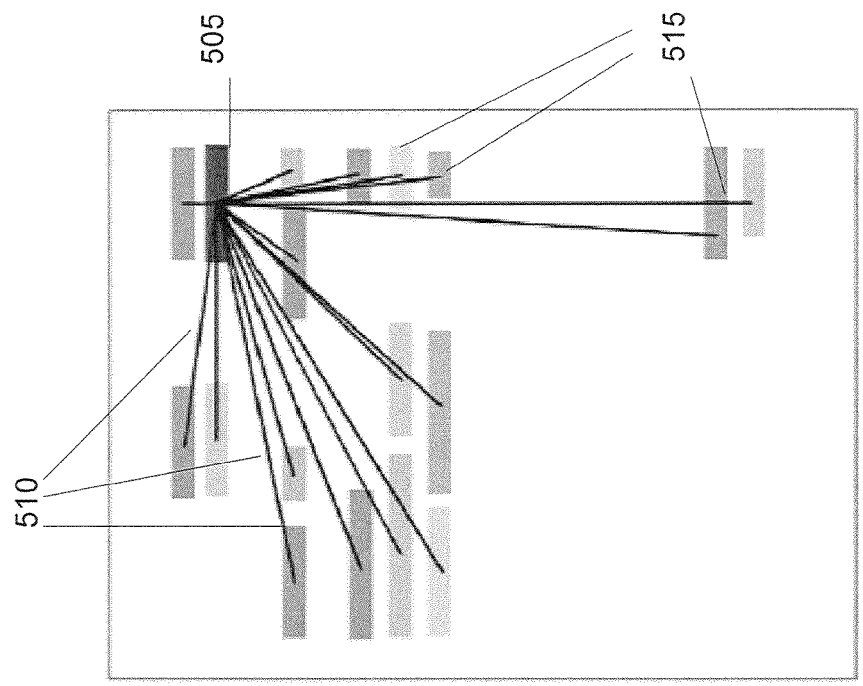
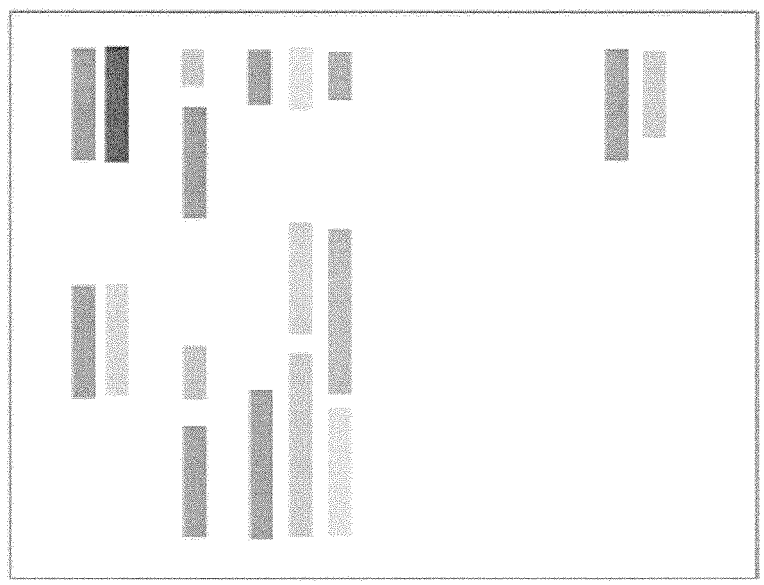
FIGURE 5

FIGURE 12
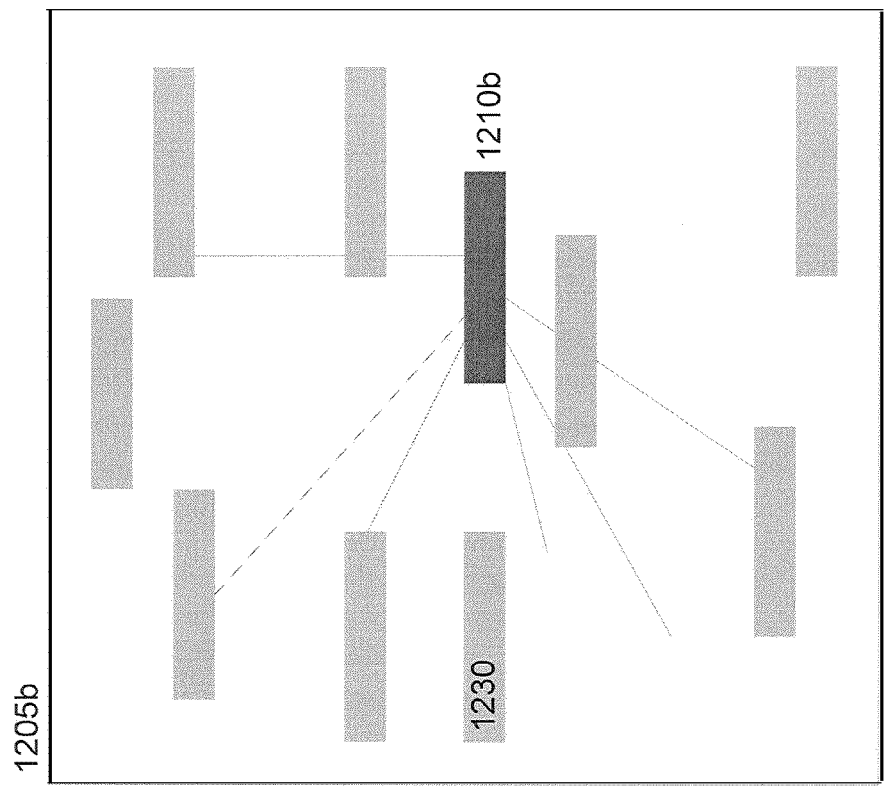
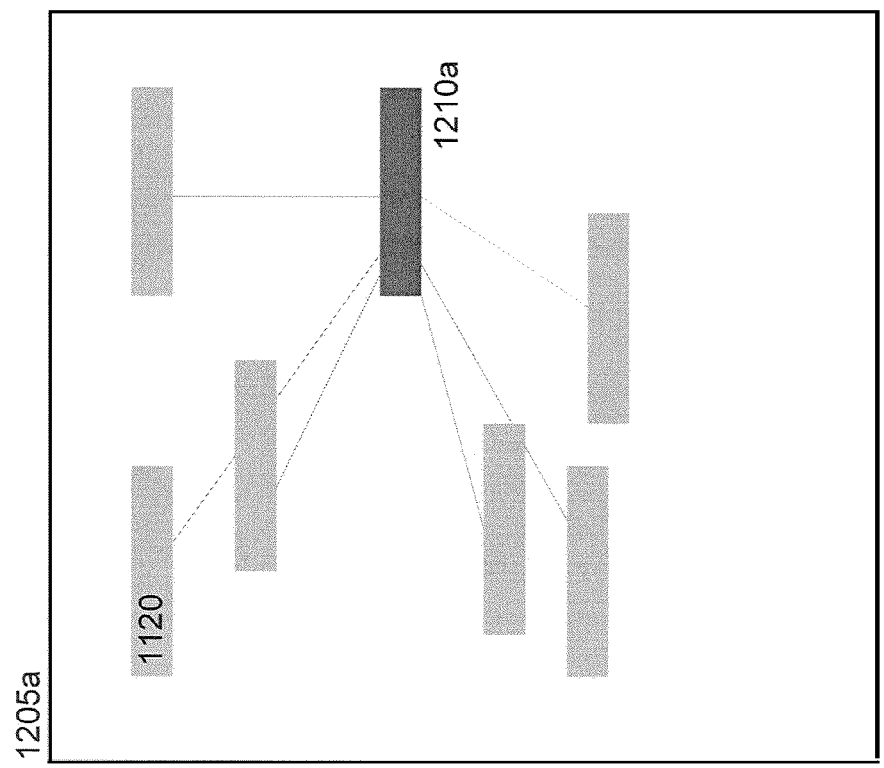

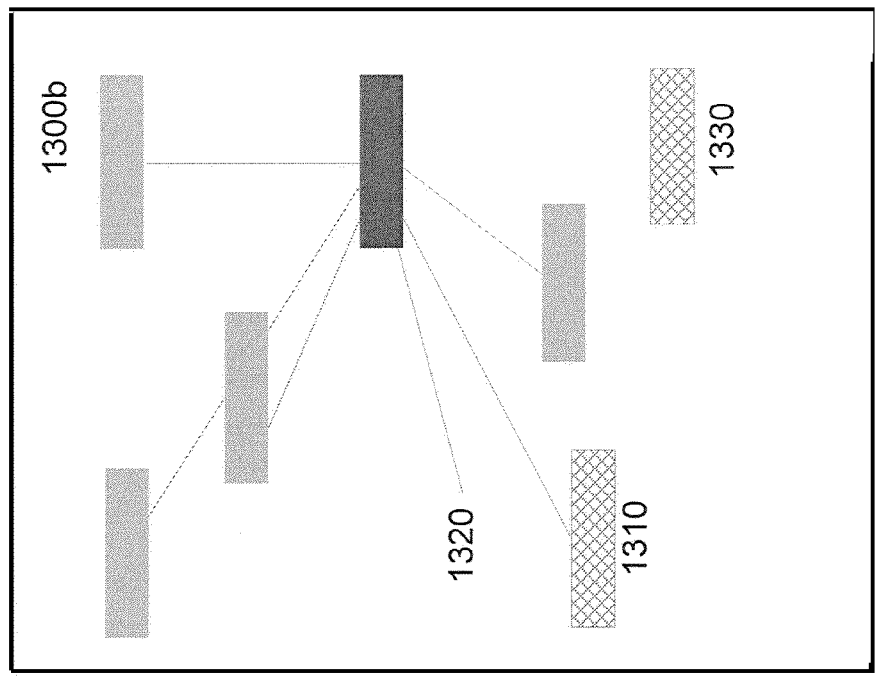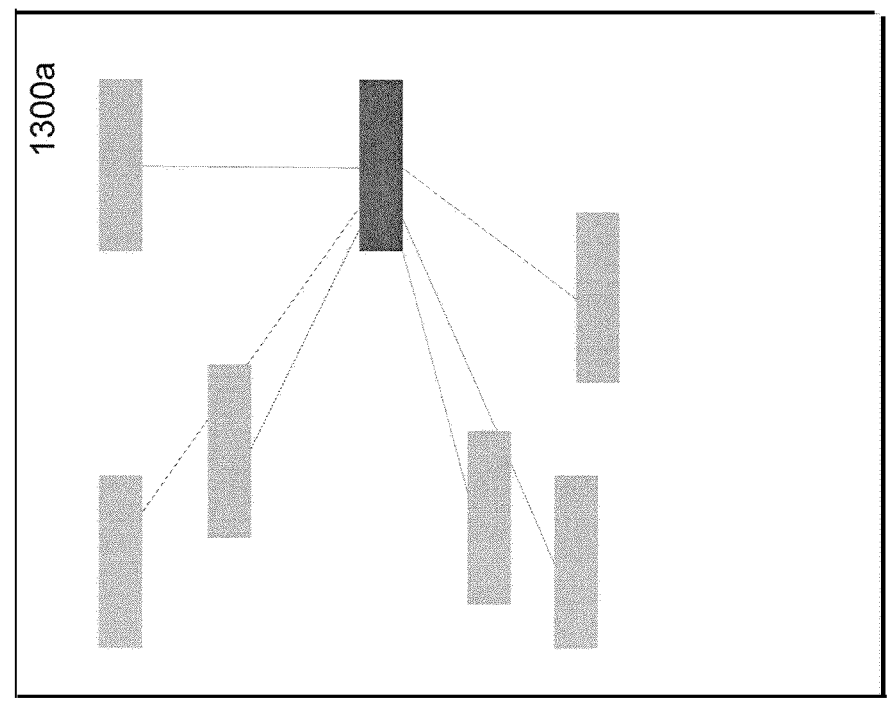
FIGURE 13

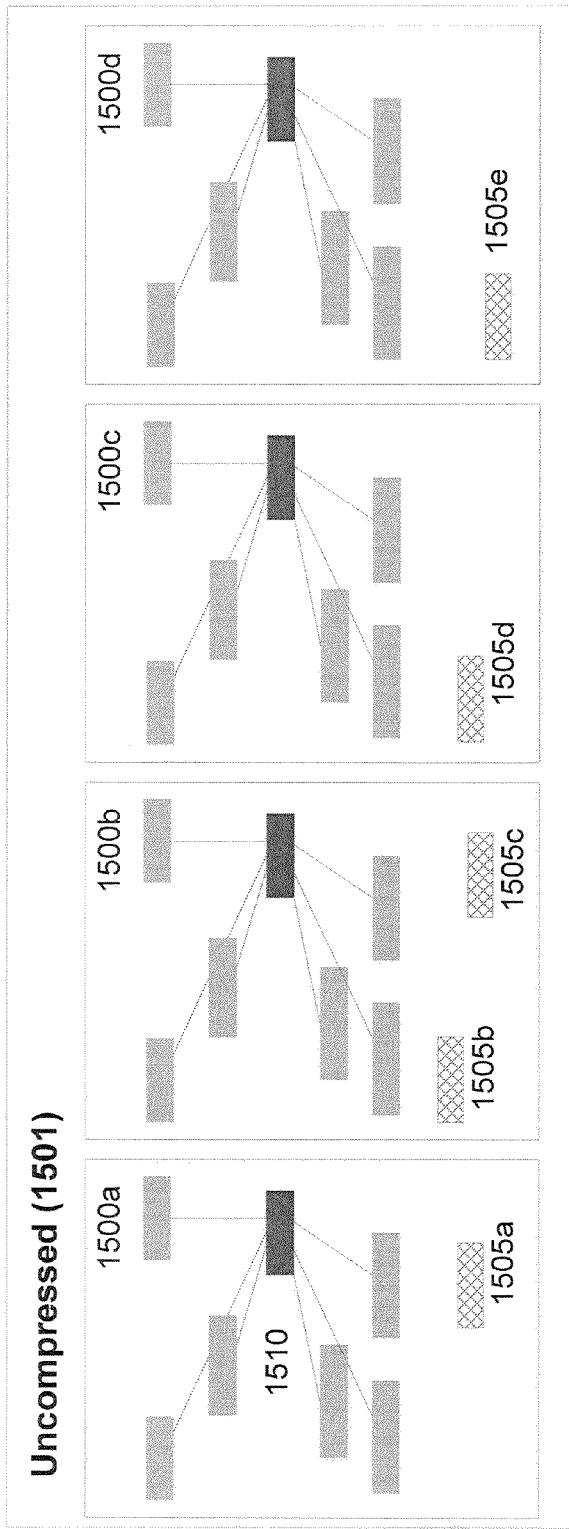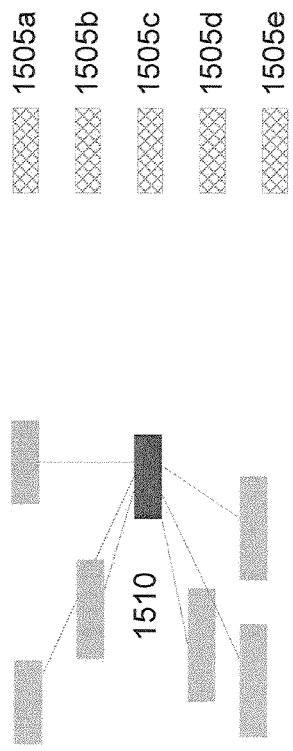
FIGURE 15

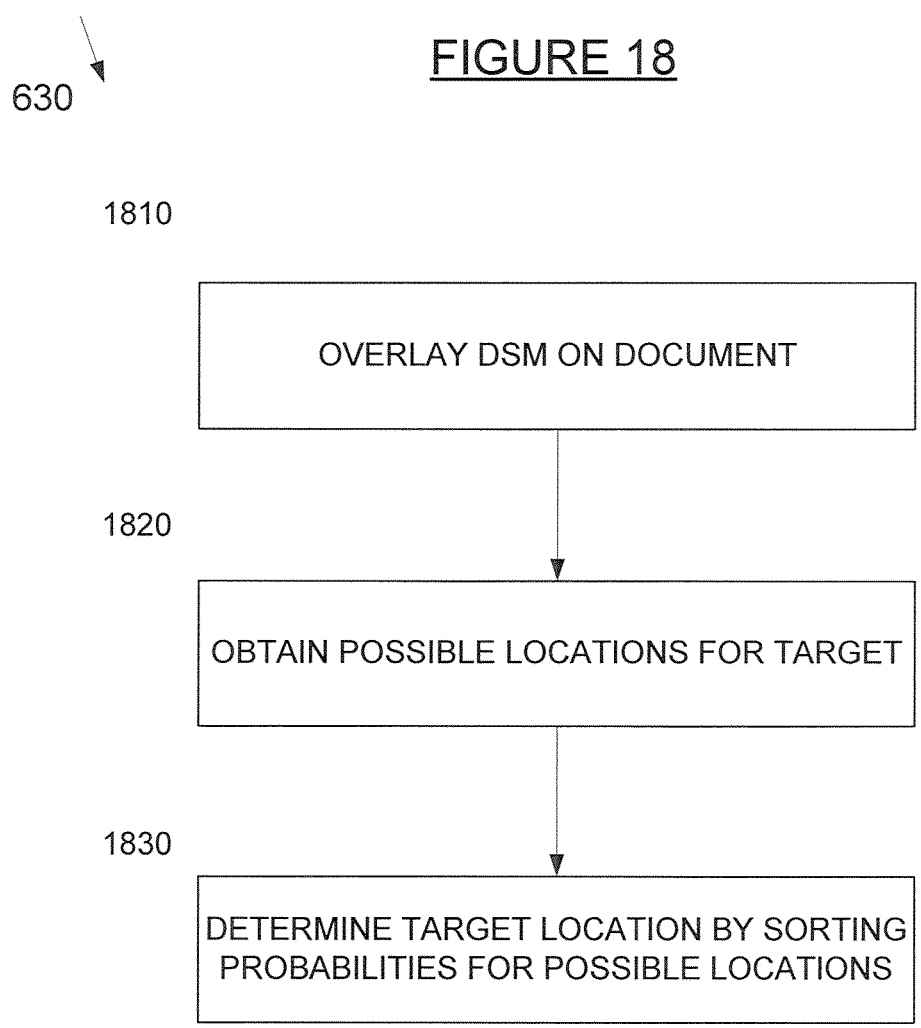

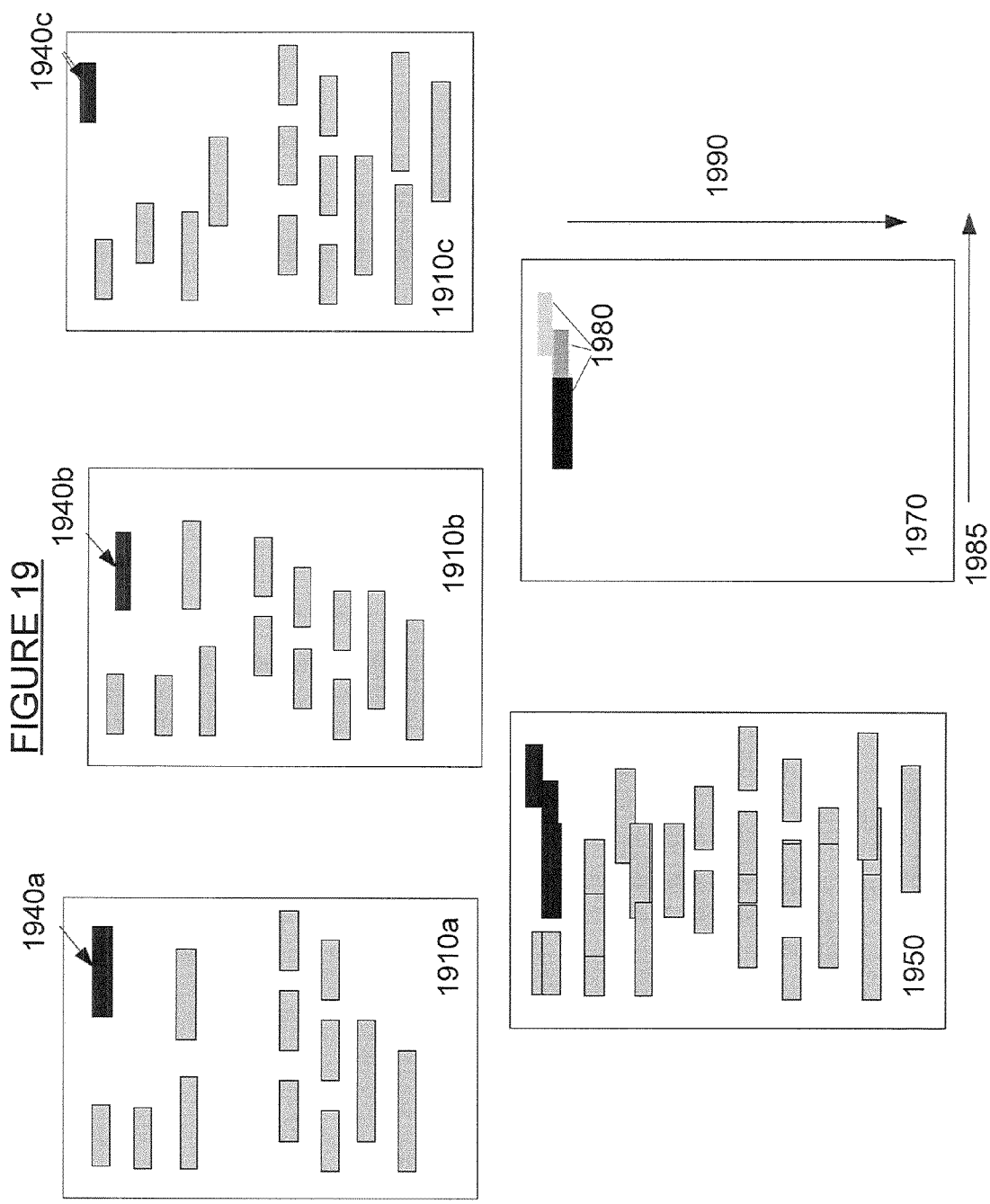

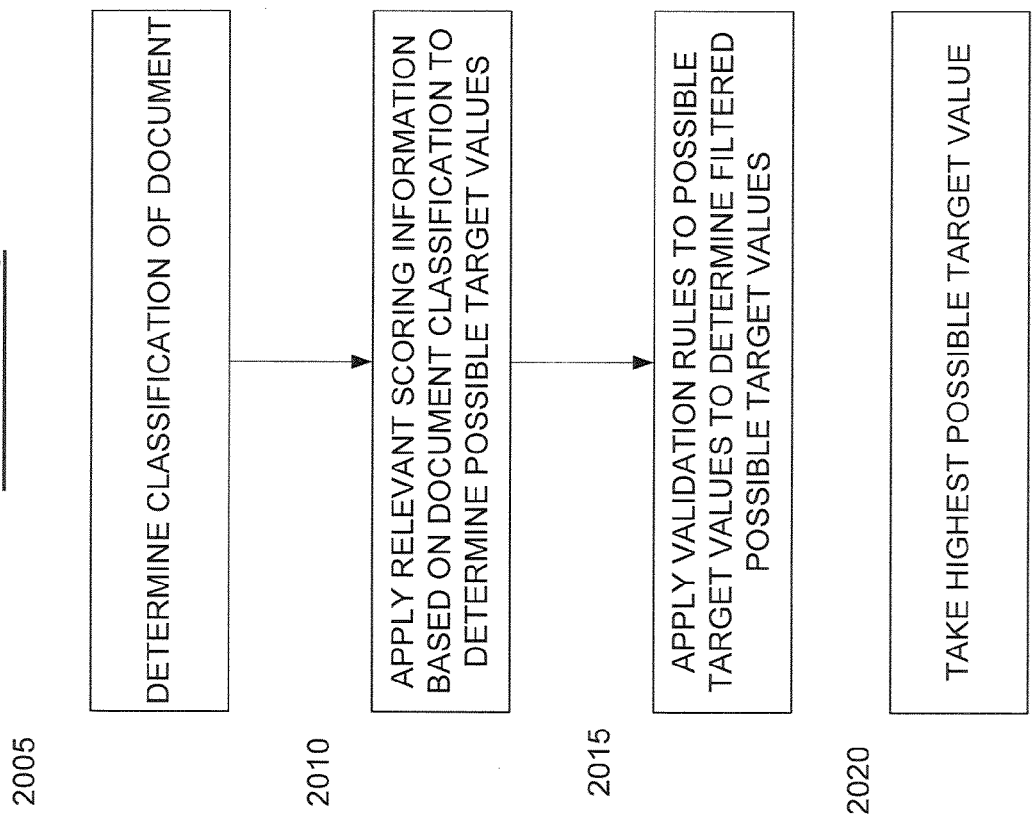

SYSTEM AND METHOD OF USING DYNAMIC VARIANCE NETWORKS

BRIEF DESCRIPTION OF THE FIGURES

FIGS. 2-4 illustrate a method for locating at least one target in at least one document utilizing dynamic variance networks (DVNs), according to one embodiment.

FIGS. 3-15 illustrate examples of locating at least one target in at least one document utilizing DVNs, according to several embodiments.

FIGS. 16-18 illustrate a Method for locating at least one target in at least one document utilizing dynamic sensory maps (DVNs), according to one embodiment.

FIG. 19 illustrates an example of locating at least one target in at least one document utilizing DVNs, according to one embodiment.

FIG. 20 illustrates a method for obtaining information about at least one document, according to one embodiment.

DETAILED DESCRIPTION OF EMBODIMENTS OF THE INVENTION

Figure 1:
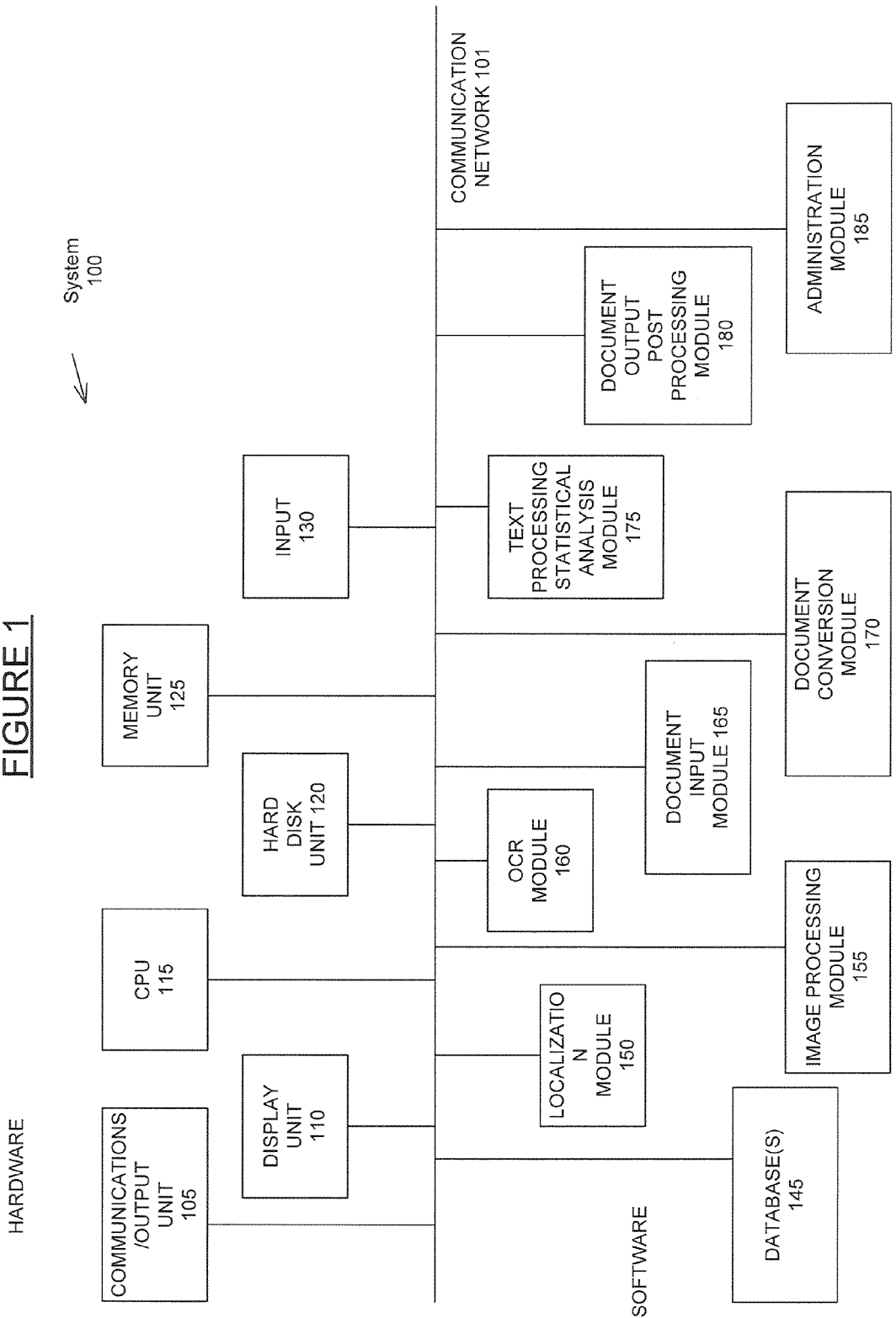
FIG. 1 illustrates a system for obtaining information about at least one document, according to one embodiment.

FIG. 1 illustrates a system for obtaining information about at least one document, according to one embodiment. In one embodiment, the system 100 can comprise at least one communication network 101 that connects hardware and software elements. In some embodiments, the hardware can execute the software.

The hardware can comprise at least one communications/output unit 105, at least one display unit 110, at least one centralized processing unit (CPU) 115, at least one hard disk unit 120, at least one memory unit 125, and at least one input unit 130. The communications/output unit 105 can send results of extraction processing to, for example, a screen, printer, disk, computer and/or application. The display unit 110 can display information. The CPU 115 can interpret and execute instructions from the hardware and/or software components. The hard disk unit 120 can receive information (e.g., documents, data) from CPU 115, memory unit 125, and/or input 130. The memory unit 125 can store information. The input unit 130 can receive information (e.g., a document image or other data) for processing from, for example, a screen, scanner, disk, computer, application, keyboard, mouse, or other human or non-human input device, or any combination thereof.

The software can comprise one or more databases 145, at least one localization module 150, at least one image processing module 155, at least one OCR module 160, at least one document input module 165, at least one document conversion module 170, at least one text processing statistical analysis module 175, at least one document/output post processing module 180, and at least one systems administration module 185. The database 145 can store information. The image processing module 155 can include software which can process images. The OCR module 160 can include software which can generate a textual representation of the image scanned in by the input unit 130 (e.g., scanner). It should be noted that multiple OCR modules 160 can be utilized, in one embodiment. The document input module 165 can include software which can work with preprocessed documents (e.g., preprocessed in system 100 or elsewhere) to obtain information (e.g., used for training). Document representation (e.g., images and/or OCR text) can be sent to the localization module 150. The document conversion module 170 can include software which can transform a document from one form to another (e.g., from Word to PDF). A text processing statistical analysis module 175 can include software which can provide statistical analysis of the generated text to pre-process the textual information. For example, information such as the frequency of words, etc. can be provided. A document/output post processing module 180 can include software which can prepare a result document in a particular form (e.g., a format requested by a user). It can also send result information to an external or internal application for additional formatting and processing. The system administration module 185 can include software which allows an administrator to manage the software and hardware. In one embodiment, individual modules can be implemented as software modules that can be connected (via their specific interface) and their output can be routed to modules desired for further processing. All described modules can run on one or many CPUs, virtual machines, mainframes, or shells 4 within the described information processing infrastructure, such as CPU 115. Database 145 can be stored on hard disk drive unit 120.

The localization module 150 can utilize at least one document classifier, at least one dynamic variance network (DVN), at least one dynamic sensory map (DSM), or at least one fuzzy format engine, or any combination thereof. A document classifier can be used to classify a document using, for example, a class identifier (e.g., invoice, remittance statement, bill of lading, letter, e-mail; or by sender; vendor, or receiver identification). The document classifier can help narrow down the documents that need to be reviewed or to be taken into account for creating the learn sets. The document classifier can also help identify which scoring applications (e.g., DVNs, DSMs, and/or fuzzy format engines) should be used when reviewing new documents. For example, if the document classifier identifies a new document as an invoice from company ABC, this information can be used to pull information learned by the DVN, DSM, and fuzzy format engine from other invoices from company ABC. This learned information can then be applied to the new document in an efficient manner, as the learned information may be much more relevant than, for example, information learned from invoices from company BCD. The document classifier is described in more detail with respect to FIG. 20.

As mentioned above, the localization module 150 can include numerous scoring applications, such as, but not limited to, DVNs, DSMs, or fuzzy format engines, or any combination thereof. DVNs can be used for determining possible target values by using references on a document or piece of a document to determine possible locations for any targets. A score can be given for each possible target value identified by the DVN. DVNs are discussed further below with respect to FIGS. 2-15 and 20. DSMs can also be used to determine possible target values based on different known locations for the target. A score can be given for each possible target value identified by the DSM. DSMs are discussed further below with respect to FIGS. 16-20. In addition, fuzzy format engines can be utilized to identify possible target values by using a fuzzy list of formats for any targets. As with DVNs and DSMs, fuzzy format engines can give a score for any possible target values. Fuzzy format engines are discussed in more detail below with respect to FIG. 20.

Information generated by the localization module 150 can be sent to the databases(s) 145 or to external inputs (e.g., input unit 130, communication network 101, hard disk unit 120, and administration module 185). The output or part of the output of the localization module 150 can be stored, presented or used as input parameters in various components (e.g., communications/output unit 105, display unit 110, hard disk unit 120, memory unit 125, communication network 101, conversion module 170, database(s) 145, OCR module 160, statistical analysis module 175) either using or not using the post-processing module 180. Such a feedback system can allow for iterative refinement.

Document Classifier

As indicated above, the document classifier can be used to classify a document using, for example, a class identifier (e.g., invoice, remittance statement, bill of lading, letter, e-mail; or by sender, vendor, or receiver identification). The document classifier can operate based on text in a document. The document classifier can also be based on positional information about text in a document. Details relating to how a document classifier can classify a document using any combination of textual and/or positional information about text from the document is explained in more detail in the following patent application/patents, which are herein incorporated by reference: US2009/0216693, U.S. Pat. Nos. 6,976,207, and 7,509,578 (all entitled "Classification Method and Apparatus").

Once the text information and text positional information is obtained for at least one training document, this information can be used to return an appropriate class identifier for a new document. (It should also be noted that a human or other application can provide this information.) For example, if invoices issued by company ABC are to be reviewed, certain text (e.g., "ABC") or text positional information (e.g., where "ABC" was found to be located on training documents using, for example, DVNs or DSMs) found on the training set of documents can be searched on new documents to help determine if the new document is an invoice issued by company ABC. Documents identified as invoices issued by company ABC can be reviewed with company ABC-specific DVNs, DSMs and/or fuzzy searching machines.

It should be noted that the document classification search can be performed in a fuzzy manner. For example, punctuation or separation characters, as well as leading or lagging alphabetical characters and leading or lagging zeroes can be ignored. Thus, for example, "123-45", "1/2345", "0012345", "INR1234/5" can be found if a fuzzy search is done for the string "12345". Those of ordinary skill in the art will see that many types of known fuzzy searching applications can be used to perform the document classification search. Other examples of fuzzy representations and their respective classification are described in further detail in the following patent application/patents, which are herein incorporated by reference: US 2009/0193022, U.S. Pat. Nos. 6,983,345, and 7,433,997 (all entitled "Associative Memory").

As explained above, the document classifier can help narrow down the documents that need to be reviewed. The document classifier can also help identify which scoring applications (e.g., DVNs, DSMs, and/or fuzzy format engines) should be used when reviewing new documents. This learned information from the DVNs, DSMs, and/or fuzzy format engines can then be applied to the new document in an efficient manner, as the learned information may be much more relevant than, for example, information learned from invoices from company BCD.

FIG. 20 illustrates an example use of document classifiers with scoring applications. (It should be noted that document classifiers do not need to be used to narrow down the documents. It should also be noted that many other scoring applications can be utilized. Furthermore, it should be noted that other applications can be used to determine information about targets.) Referring to FIG. 20, in 2005, a document classifier is utilized to choose the most relevant scoring information. For example, if the document classifier identifies a new document as an invoice from company ABC, this information can be used to pull information learned by the DVN, DSM, and fuzzy format engine from other invoices from company ABC. In 2010; the relevant DVN, DSM and fuzzy format information (e.g., related to invoices issued by company ABC) can be applied to the classified document to obtain any possible target values along with a score for each. In 2015, validation rules can be used to narrow down the set of possible target values. For example, only possible target values for targets NET, VAT and TOTAL that satisfy the formula NET+VAT=TOTAL can be returned as filtered possible target values. Other example validation rule could include: that the date of a document has to be later than Jan. 1, 2005; or that an order number needs to be within a certain range. In 2020, the filtered possible target values are compared to each other, and the filtered possible target value with the highest score can be used as the target value. Note that in other embodiments, all filtered possible target values, or even all unfiltered possible target values could be shown to a person or fed to another application.

Dynamic Variance Networks (DVNs)

Figure 2:
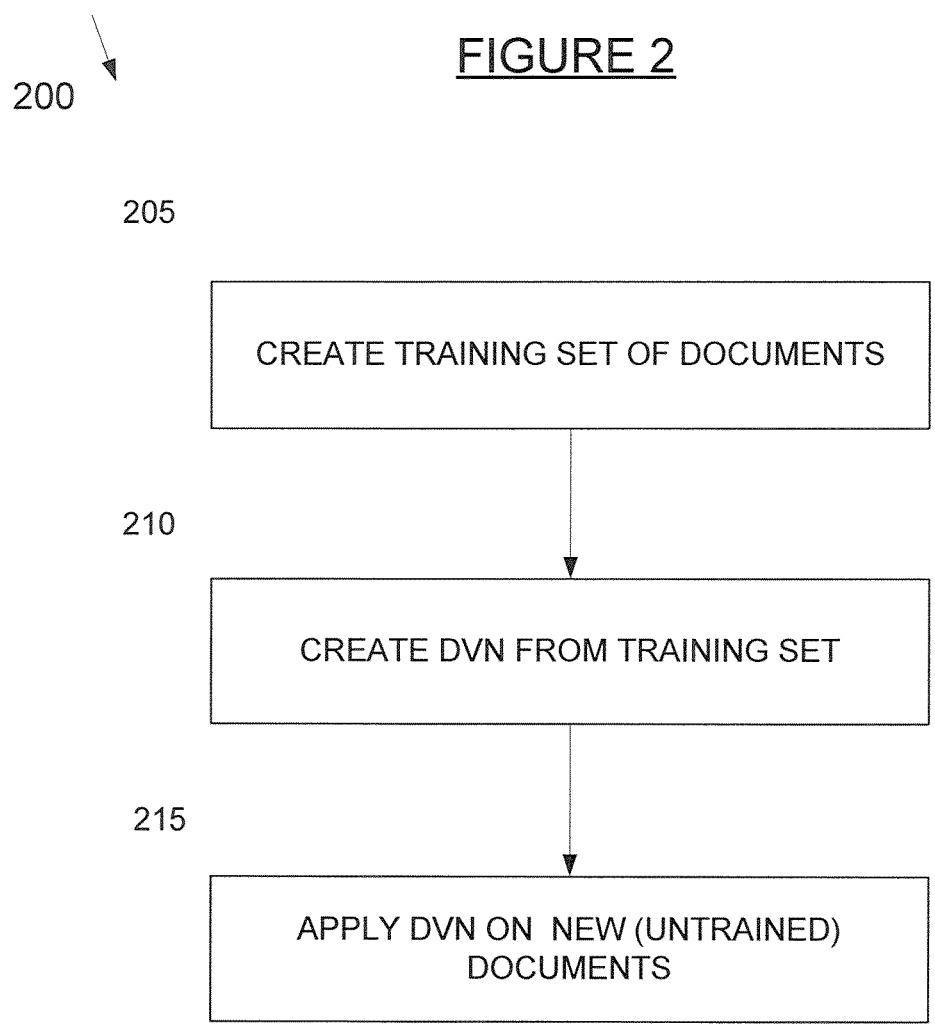

FIG. 2 illustrates a method 200 for locating at least one target in at least one document utilizing DVNs, according to one embodiment. In 205, one or more documents (or pieces of documents) can be used for training. In 210, at least one DVN can be created from information compiled from the training set of documents. The DVN can be a set of "keyword" references (e.g., any textual/digit/character block, such as a word, number, alpha-numeric sequence, token, logo, text fragment, blank space etc.) and reference vectors for this set of references. Each reference vector can connect a reference to a target. In 215, the DVN can be applied on untrained documents to localize at least one target on the untrained documents. The localization can determine where on the untrained documents the position of the target is expected to be. This can help obtain or confirm information about the target (e.g., such as the target value Jan. 10, 2009 for the target "invoice date"). For example, if the target is a document field, such as a date, the value present at the target can be extracted. If there is no reference at the given target position, it can be indicated that the target is not present on the document. Example targets can include, but are not limited to: check boxes, signature fields, stamps, address blocks, fields (e.g. total amount for invoices, weight of package on delivery notes, credit card number on receipts), manual or automatically edited entries on maps, image related content in text/image mixed documents, page numbers, etc.

It should be noted that the above method 200 can provide increased redundancy and accuracy. Because every reference is a potential basis for target localization, there can be hundreds of reference anchors per page for each target. Thus, even for torn pages, where all classical keywords are missing, a target localization can be found.

In addition, it should be noted that a reference with a typo or misrecognized by an OCR engine at a particular position can automatically be used as an anchor based on where the reference is found. Thus, in some embodiments, there is no need to specify traditional keywords or apply any limitation to anchor references. In this way, strict and/or fuzzy matching can be utilized to match any similar reference to at least one reference in a new document.

Furthermore, the following characteristics of the reference can be taken into account when matching: font; font size; style; or any combination thereof. Additionally, the reference can be: merged with at least one other reference; and/or split into at least two references.

FIG. 3 illustrates details of the method 210 for creating the DVN from the training set, according to one embodiment. In 305, a set of "keyword" references can be created from at least one reference found on at least one document used for training. In 310, at least one reference vector can be created for each reference.

FIG. 5 illustrates a view of a document, where gray areas 510 denote different references that could be used as the set of "keyword" references. The reference vectors 515 are lines from each reference to a particular target 505. Different colors of gray can indicate different content. For example, the darker gray could represent content that is word content. As another example, the lighter gray could represent content that is a number or a combination of numbers and letters. Additional examples of content include, but are not limited to: number and punctuation strings, OCR-mis-recognized characters (e.g., "/(!*7%8[ ]4$2§" for part of a stamp on an image), words in different languages, words found in dictionaries, words not found in dictionaries, different font types, different font sizes, different font properties, etc.

In 315, variance filtering can be performed by selecting similar reference vectors. The variance filtering can compare the references and the reference vectors for all documents in the learn set, compare the type of references, and keep similar reference vectors. Similar reference vectors can be similar in terms of position, content similar, and/or type similar for the reference. A reference can be positionally similar when the reference is usually found in one or more particular places on a page. Content similarity relates to references having the same type of content (e.g., when the references are all the same word or similar words). Type similarity relates to the reference usually being a particular type (e.g., a numerical value, a word, a keyword, a font type, etc.). Similarity types can be tied to other similarity types (e.g., when the references are all content similar, the same word or similar words, but only when the references are type similar as well (e.g., all of the type "date")).

It should be noted that the reference consistency tests can be fuzzy. An example of fuzzy testing with a positionally similar reference is when everything within a defined x and y coordinate space is utilized, and the space parameters are able to be adjusted. An example of content consistency is determined by comparing words. Thus, "Swine-Flu", "swineflu", "Schweinegrippe" and "H1N1" can be assumed to be identical for a special kind of fuzzy comparison. "Invoice Number", "Inv0!ce No." and "invoiceNr" can be assumed to be identical for another kind of fuzzy comparison. An example of type similar fuzzy testing is when more than one type can be used (e.g., both "number" type and "number/letter" type for a date).

Figure 6:
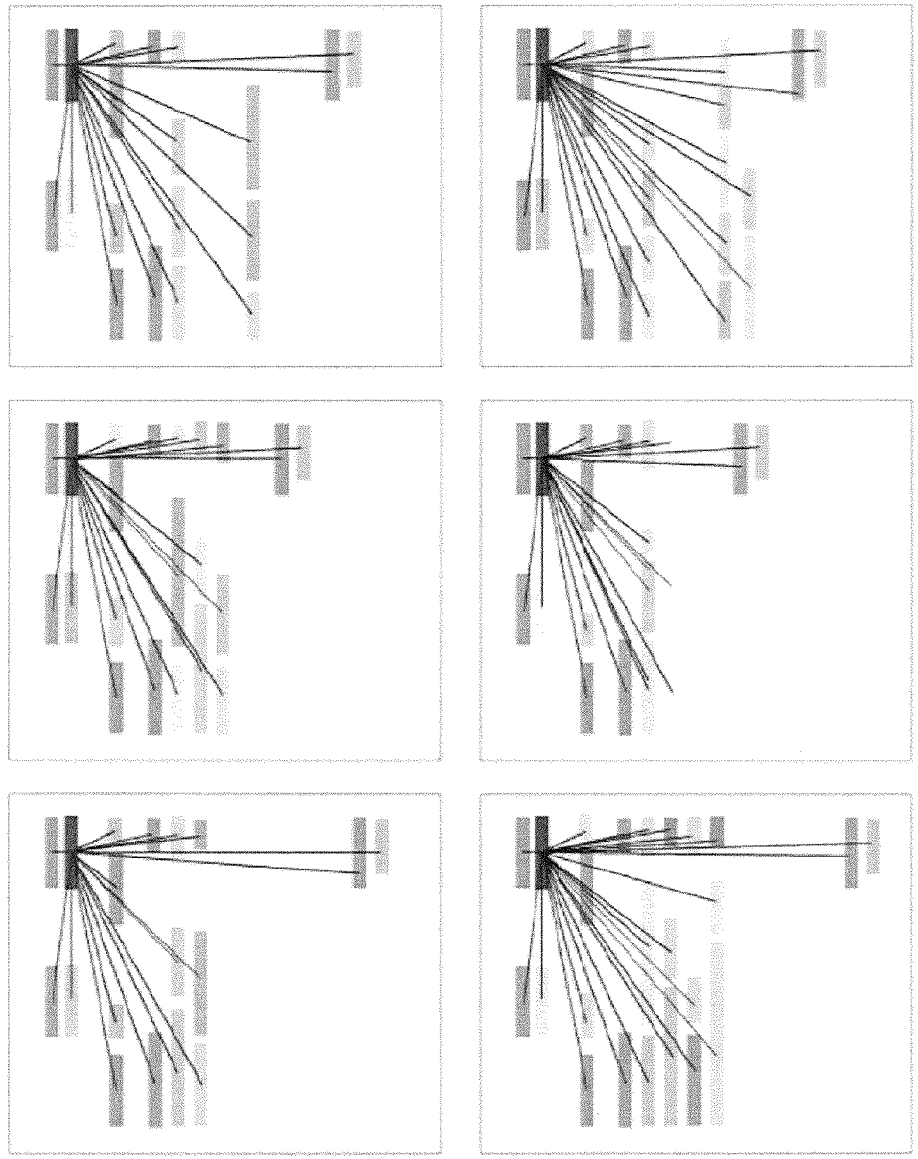

In 320, the similar reference filters are used to create the DVN. For example, FIG. 6 illustrates the DVNs (i.e., reference vectors for the "keyword" references) for six documents. The six documents illustrate the variability in terms of references and positions across different documents and its effect on the reference vectors.

Figure 7:
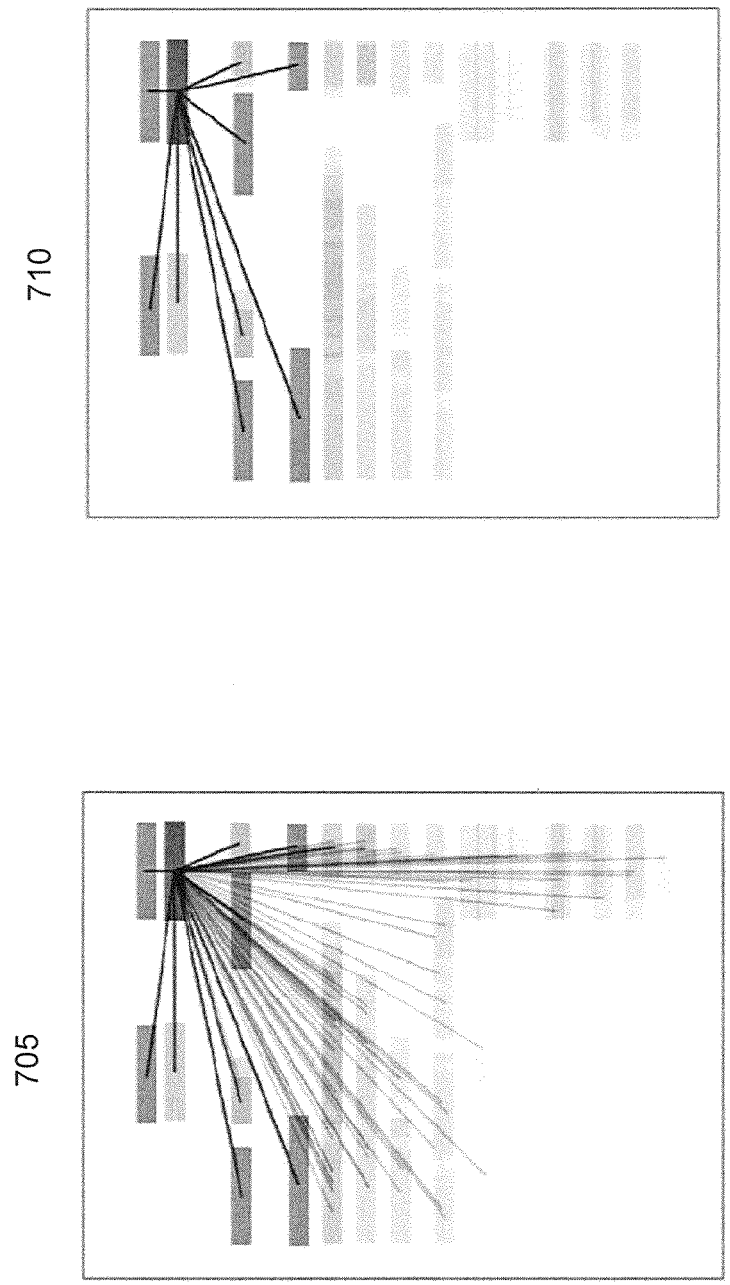

FIG. 7 illustrates the variance filtering 315 (e.g., overlaying) of all six documents from FIG. 6. 705 illustrates the reference vectors in FIG. 6 on one stack. The variability and consistency of the reference vectors is indicated with the darkness of the lines. The darker the line on FIG. 7, the more often the reference vector was found when overlaying the documents. 710 illustrates the effect of a consistency filter on the reference vectors. The minimal amount of consistency across the reference vectors and the documents can be configurable and can have a value between 1 (meaning every reference vector is kept) and N (the number of documents in the current set, meaning only the reference vectors present on all documents are considered useful). For example, if the selected value for the consistency is 5, and the number of documents is 7, the similar vector for one specific word at a specific position must be found on 5 out of 7 documents to keep this reference vector.

Figure 9:
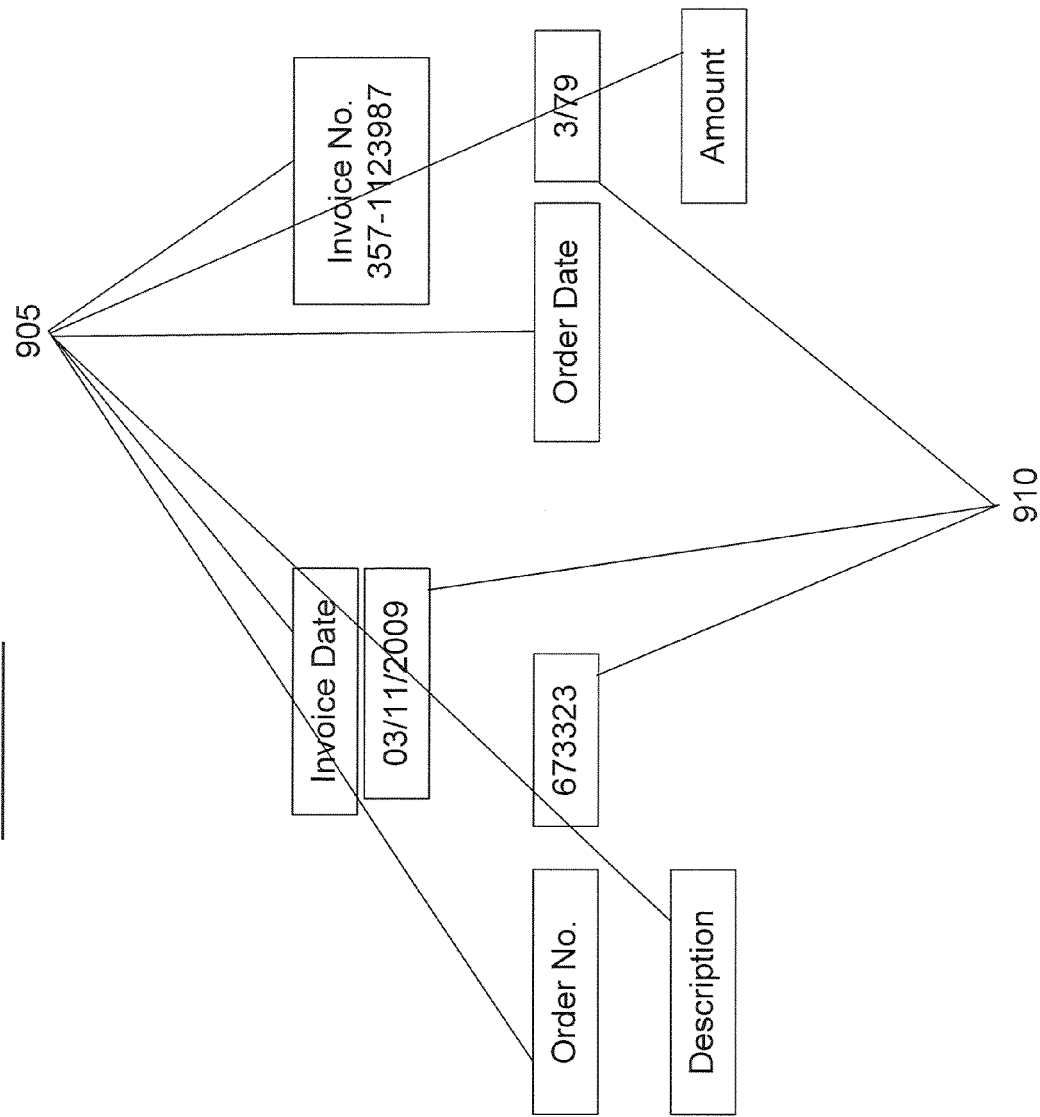

It should be noted that the content, position and type of reference can be used to filter reference vectors and construct the DVN, especially when only totally similar reference vectors are used. FIG. 9 illustrates an example result when only fully similar (e.g., the reference vectors are similar (e.g., lining up) or similar in a fuzzy manner (e.g., almost lining up, "almost" being a preset variance) in all documents in the learn set) reference vectors are kept. References 905 have maximum stability (e.g., content, position and type similar), and, in one embodiment, could be represented in a first color. References 910 are only stable with respect to position and type, and, in one embodiment, can be shown in a second color. References stable in neither position, content or type are not shown in FIG. 9.

Figure 8:
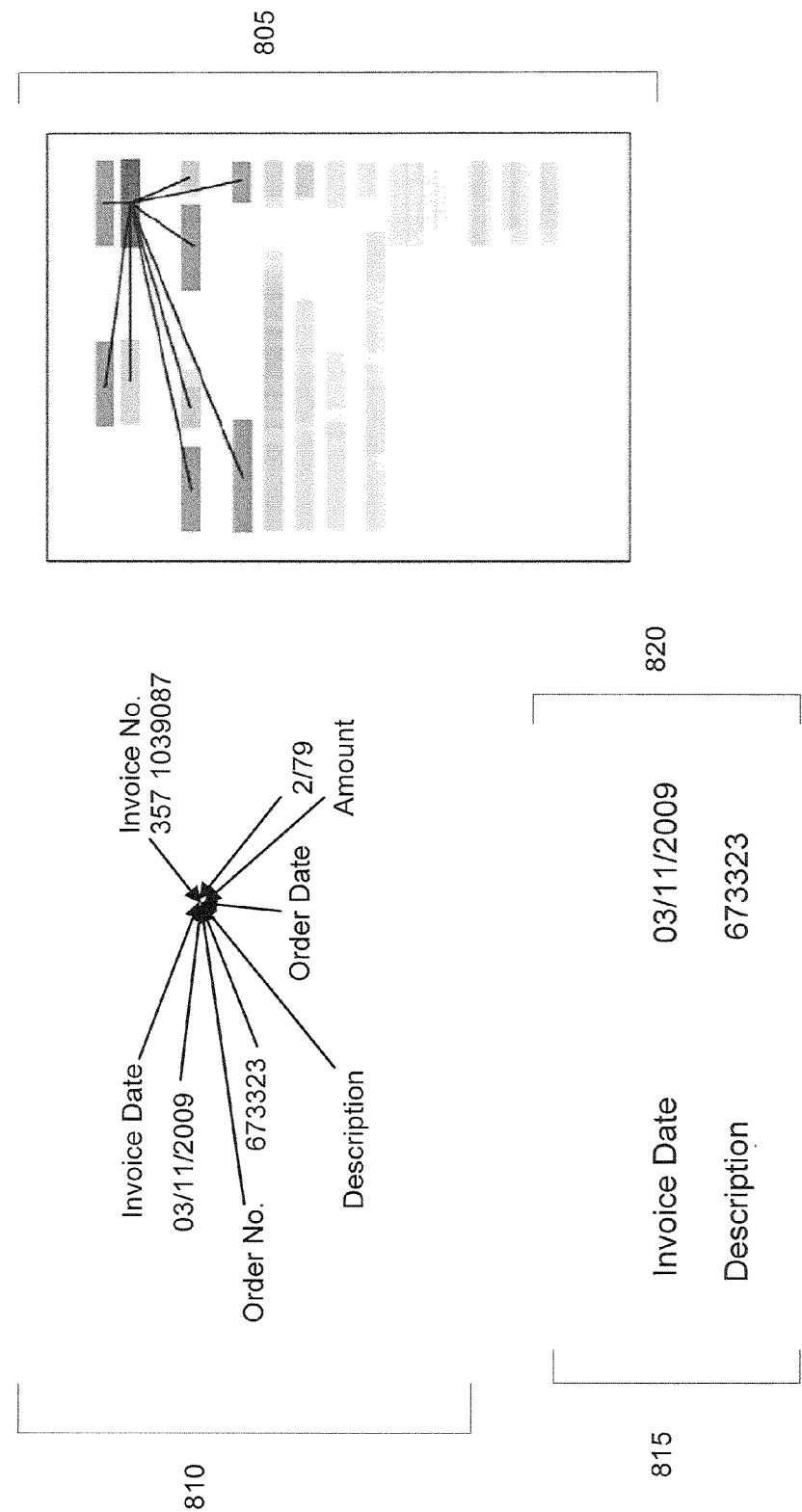

Note that the image of a reference can be blurry in some situations because identical content with small positional changes can render the words readable but blurry. When the content is not the same (e.g., numbers for the invoice date, invoice number, order date and order number), the content may be unreadable in the overlay. As shown in FIG. 8, 810 illustrates the variability of the content and its impact on the variability filtering (e.g. when each document in the learn set is overlaid on one another), according to one embodiment. In 815, enlarged versions of words having low content variance are shown. In 820, enlarged versions of words having high content variance are shown. In one embodiment, content with no or low variance can be considered as more valuable information for building the dynamic variance network, due to content stability. More variable content (e.g., date), can be referred to as unstable reference points and can be considered less important.

Figure 4:

FIG. 4 illustrates details of applying the DVN for target localization on untrained documents 215, according to one embodiment. In 405, all references on the document to be processed are compared with a DVN "keyword" reference list to determine which references are most relevant. The DVN "keyword" list is a list of references consistently found by the training. In one embodiment, only references found in all the documents used for training are used on the DVN "keyword" reference list. In other embodiment, references found in most of the documents used for training can be used.

For example, using the example of 710, 805 and 810 of FIGS. 7 and 8, the similar references from the training could include the following word-type references (designated by a dark gray): "Invoice N", "Invoice Date", "Order No.", "Order Date", "Description", and "Amount". Variants of these references (e.g., Order Number instead of Order No.) can also be used. The similar references from the training could also include number or number/letter character strings (designated by a light gray) of the form: XX/XX/XX (for Date), XXXXXXXXXX (for Invoice No.), XXXXXX (for Order No.), and XX/XX (for Order Date).

In 410, all of the reference vectors that relate to the "keyword" references can be used to point towards the target. In 415, the integrating of the pointer information from all of the reference vectors and the reference keywords can then used to localize (determine) the target.

Figure 10:
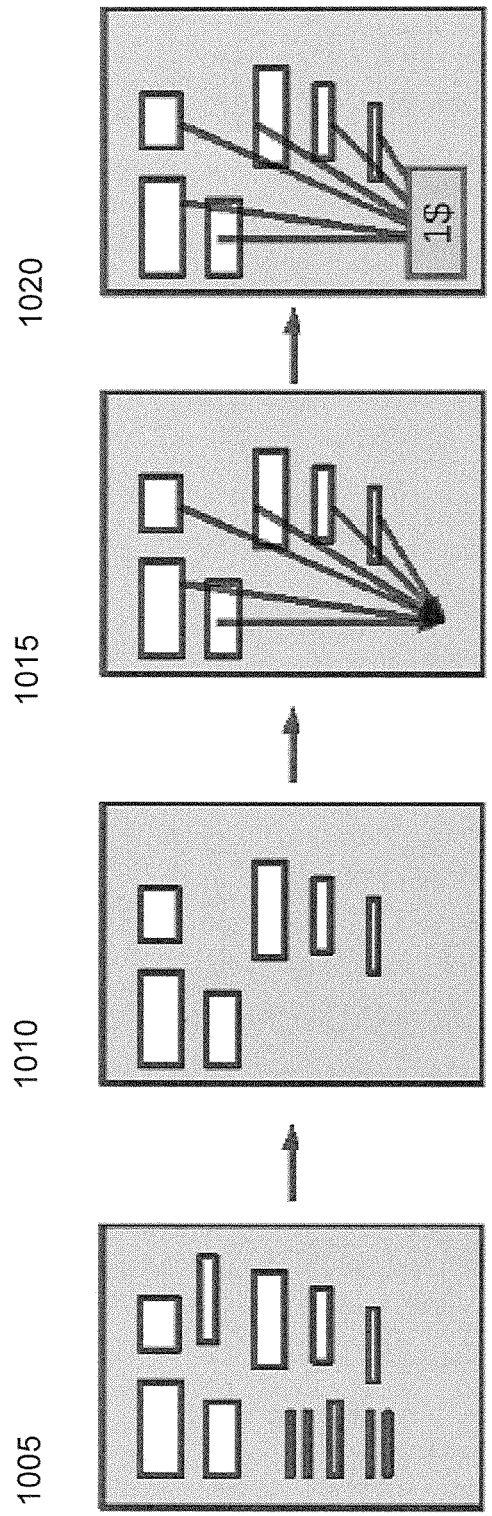

For example, in FIG. 10, in 1005, all the references for a document are shown. In 1010, the references after the positional consistency filter is applied are shown. In 1015, the reference vector information from these references from various documents are applied and compared. In 1020, the similar reference vectors are used to determine the locality of the target.

Once possible positions for the locality of any targets are found using the DVNs, possible values for the targets can be found (e.g., Jan. 10, 2009 as the value for the target "invoice date"). Each possible value for the target can be given a score. The score can be determined by the ratio of the reference vectors hitting the target against the reference vectors not pointing to the target. Additionally, the fuzzy edit distance between the learned reference(s) (e.g., text) and the reference(s) used for localization can be integrated as a weight. For example, if all possible reference words on a document could be found exactly at the same relative position from the target as the ones stored in the learn set, the highest score can be returned. Additional references not contained in the learn set, or references with no vectors pointing towards the respective target can reduce the score.

It should be noted that DVNs can be used for many additional tasks, including, but not limited to: the addition of reference vectors, reference correction, document classification, page separation, recognition of document modification, document summarization, or document compression, or any combination thereof. These tasks are explained in more detail below.

Addition and/or removal of Reference Vectors. DVNs can be dynamically adapted after target localization. When at least one reference vector is learned and used to localize a target, all other possible reference vectors can be created and dynamically added to the DVN learned in 210 of FIG. 2. Furthermore, outdated (e.g., reference vectors not used for a long time, or filtered) can be removed. This can allow continuous updating of the reference vectors from all processed documents. Such a continuous updating procedure can update and change the DVN during document processing.

Figure 11:
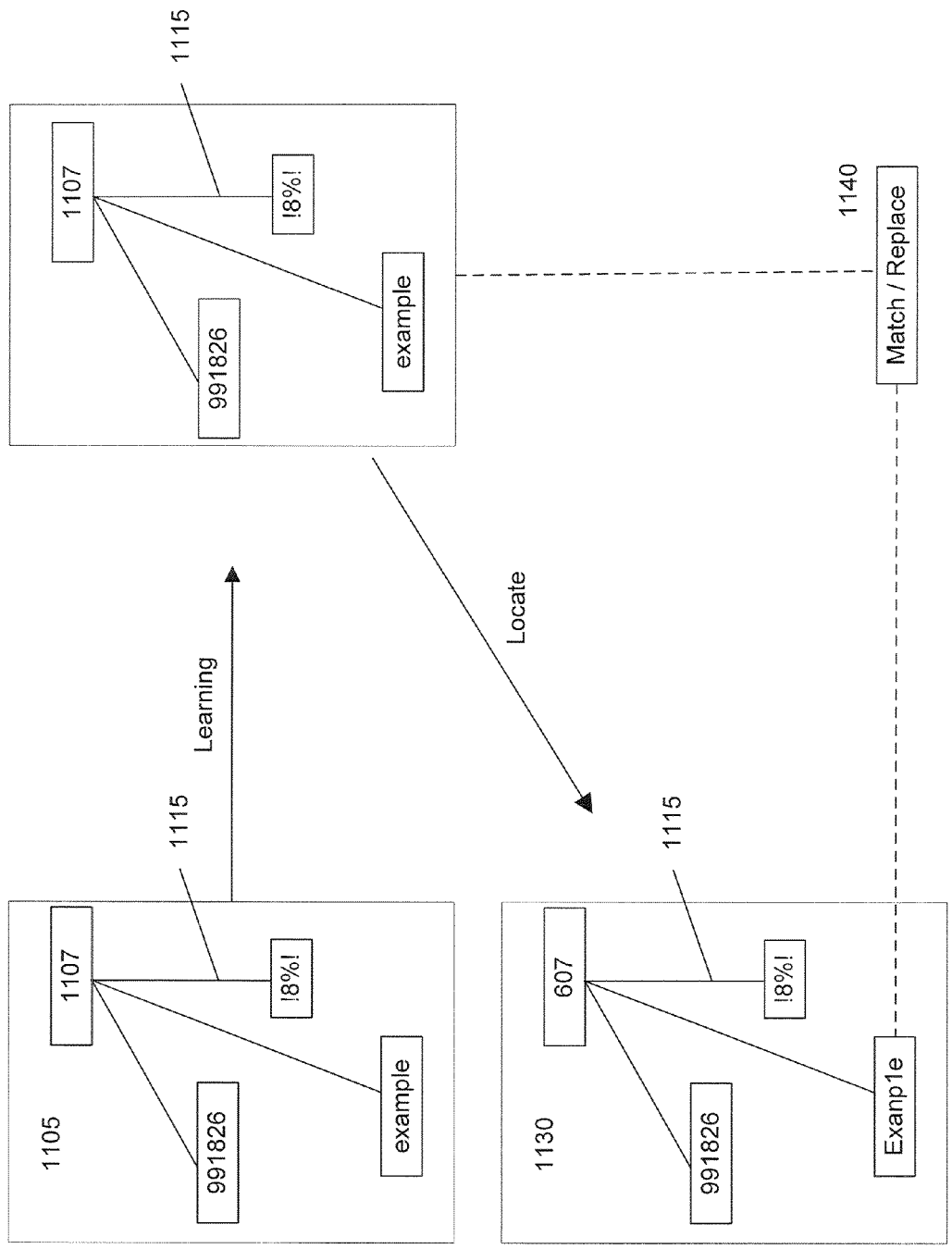

Reference Correction. Reference vectors can be used for reference correction. An example is illustrated in FIG. 11. At 1105, one learn document containing one target 1107 and three anchor references ("991826", "!8%!", "example") is shown. The respective reference vectors 1115 from the references to the target are also shown. After learning, the set of reference vectors 1115 is matched on a different document 1130. On this document 1130, the reference "example" is corrupted and spelled "Example". However, due to its location, "Example" can be matched to "example" and be replaced in 1140. This ability can help result in reference correction on processed documents.

Another example of reference vectors being used for reference correction is when the reference vectors are used to locate a target of, for example, a specific type. Additional information present can then be used to correct a potentially corrupted target. For example, if the reference vectors point towards the reference "29 Sep. 1009", and this reference is known to be a date field target from a currently retrieved document, then a correction of that target to "29 Sep. 2009" is possible. To do this correction, the high similarity between "September" and "September" is used in a fuzzy content comparison and additional information about the entry being a date can be used to correct the year to a (configurable) time period that seems to be valid. It should also be noted that, if a date field target is clearly located, then the reference vectors can be followed back to the potential anchor references. It for example, the position & information for such an anchor reference perfectly fits, then the actual reference present there, but not fitting to the anchor reference present in the learned DVN could be replaced by the one from the learned DVN. For example, if the invoice number field target was located, the surrounding classical keyword which is corrupted and shows "Inv0!ce Number" could be replaced by the one stored for this position from the learned DVN. Thus, after that correction, "Invoice Number", could be read at that position.

Document Classification. As explained earlier with respect to FIG. 1, the learned DVN can also be used for document classification, as shown in FIG. 12. Two documents (1205*a* and 1205*b*), with references anchored on the targets of the documents (1210*a* and 1210*b*) are shown. The reference vectors for document 1205*a* point to anchor reference words. For document 1205*b*, some of the reference vectors point to anchor reference whitespace. The quality of fit of the learned DVN can be measured and serve as an indicator as to whether the present document is from the same "category" or "class" as the one where the learned DVN was trained. In a many class scenario for such an application, for all collected DVNs, the overlap of the reference vectors on one target area can be measured. A high overlap of many reference vectors indicates that the anchor words may be in a similar relative position to one or many targets. This high overlap information can be used as information to determine from which class or set of documents the DVN was created.

Page Separation. Positional information regarding anchor references can also be used for page separation. In a stack of different documents (e.g., single documents, multi-page documents), the changes in the DVNs positional information (also referred to as "quality of fit" can provide information about the starting page of a new document. This method can be used to, for example, repackage piles of documents into single documents.

Recognition of Document Modification. DVNs can also be used in a reverse manner (e.g., after having located a target, looking up how well the anchor words on the present document fit to the learned anchor words of the DVN), to recognize a document modification. For example, in FIG. 13, one document (1300*a*) is learned (e.g., the DVN is created for at least one target) and then this DVN is matched later onto the potentially edited document (1300*b*) to detect modifications. There are three basic types of modification: 1) a reference vector points to a reference that has same position, but changed content (1310); 2) the reference vector points to whitespace (1320), indicating that the reference there may have been deleted or moved; and 3) there are references with no reference vectors (e.g., these may be added words 1230). Such modifications can include, but are not limited to: an exchange of words, a rephrasing of words, a removal of document parts, changes in document layout, font size or font style. Additionally, the comparison of several DVNs for different targets on one document can allow for precise "fingerprinting", essentially giving a robust and sensitive method to detect any non-typical changes in the document. For example, frequent changes in the revision number for contracts can be ignored while changes in wording can be highlighted. The option to return where and what was changed can be provided.

Figure 14:
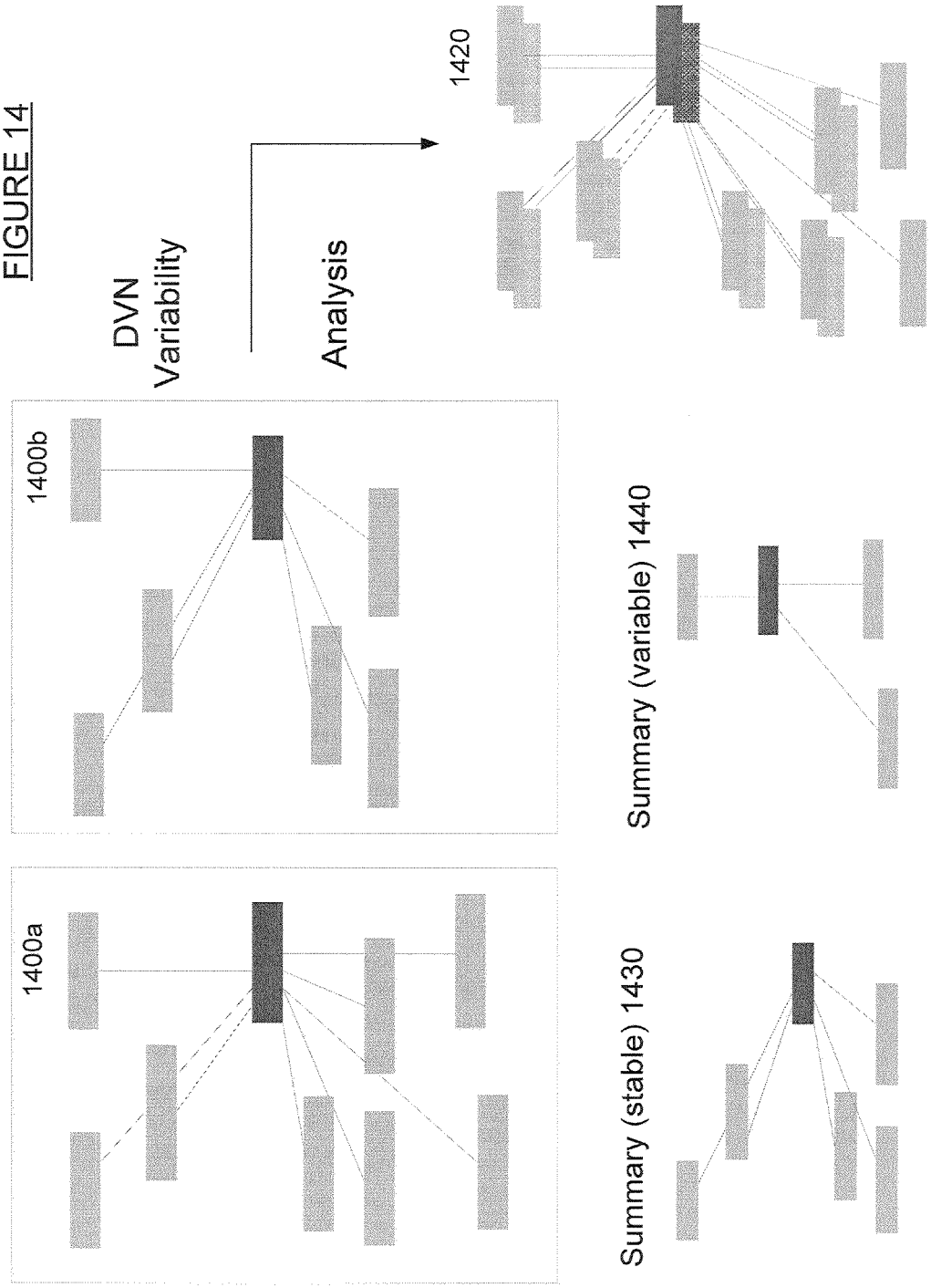

Document Summarization. DVNs can also be used to automatically summarize document content. This process is illustrated in FIG. 14. In this example, two documents (1400*a* and 1400*b*) are used as inputs, two DVNs are created, and these two DVNs are analyzed for their variability. The variance is shown in 1420 as a slightly shifted (for visual aid) overlap of the two DVNs. Note the positional and possible content variability of the references. An example for content variability, that also applies to this case is shown in FIG. 9, where 905 show stable content and 910 shows content with a certain variance. Based on this information, two summaries can be constructed: a stable summary (1430), which keeps only similar references, and a variable summary (1440), which keeps changing references. The (low variance) stable reference vectors to any target on a document can represent the "form" or "template" of the document. The (high variance) variable reference vectors can indicate individual information per document, and can thus be valuable for automatic summarization.

Document Compression. DVNs can also be used for compression of a document or set of documents. In FIG. 15, document compression is illustrated for four different documents (1500*a*, 1500*b*, 1500*c*, 1500*d*) and their respective DVNs. In the uncompressed case (1501), all four documents have to be stored. In the compressed case (1520), only the stable DVN (shown in 1510) and the deviations from that DVN (1505*a*, 1505*b*, 1505*c*, 1505*d*, 1505*e*), with the respective positions on the documents for each of the non-DVN mapped words have to be stored. For example, 1505*a* could be the string "Management-Approved" at document coordinates +1902×+962 relative to the top left corner of the document. Such variable information can be stored for 1505*b*, 1505*c*, 1505*d*, and 1505*e*. This can be seen as the application of a delta compression algorithm on the basis of the DVN. In this scenario, the DVNs and the deviations from the DVNs are stored separately, thus the redundancy of the DVNs reduce the amount of data to be stored over many documents. Moreover, all aforementioned DVN applications can be used on compressed documents as well, without the need to unpack them.

Dynamic Sensory Maps (DSMs)

Figure 16:
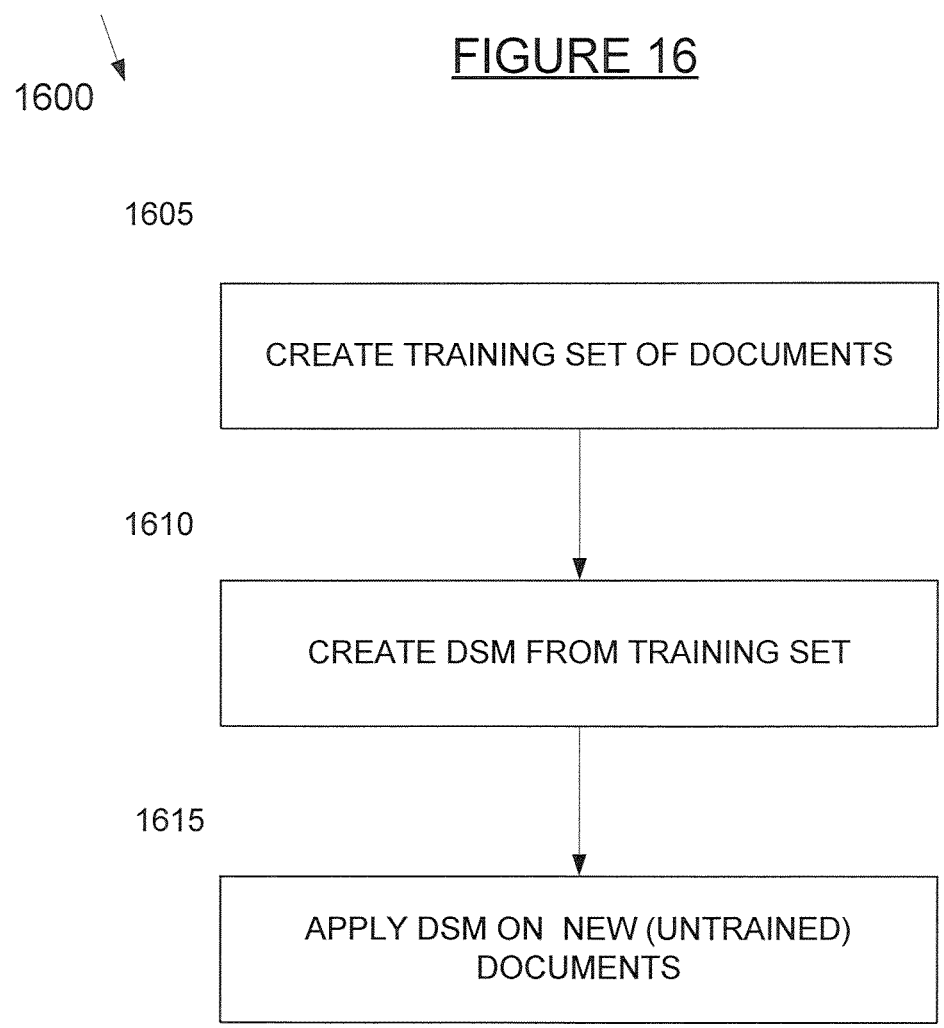

FIG. 16 illustrates a method for locating at least one target in at least one document utilizing DSMs, according to one embodiment. In 1610, one or more documents (or pieces of documents) can be used for training. In 1620, at least one DSM can be created from information compiled from the training. The DSM can be a set of possible locations for at least one target. In 230, the DSM can be applied on untrained documents to locate the target using the target possible locations.

Figure 17:
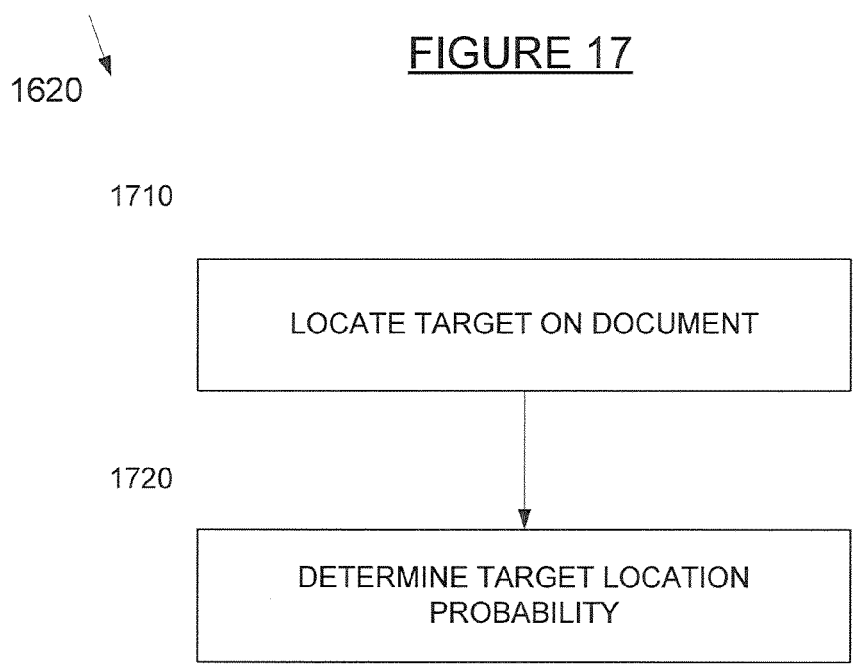

FIG. 17 illustrates details related to creating the DSM in 1620, according to one embodiment. In 1710, the at least one target is identified. In 1720, the probability for the most likely position of the target is determined. If the target location is from the first document in a set of training documents, such target location can be used as the probable location of the target. As further training documents are analyzed, the possible target locations can be increased to include other locations. The probability for each possible target location can also be determined by counting the frequency of the target being found at that location (e.g., 7 times in 10 documents). The probability for each possible target location can thus be increased or reduced (e.g., resembling un-learning or inclusion of counter-examples) as additional documents are reviewed.

FIG. 19 illustrates an example of creating the DSM. For three different documents (1910*a*, 1910*b*, 1910*c*) the location of the targets (1940*a*, 1940*b*, 1940*c*) is determined. Gray boxes indicate other potential targets or references on the documents. In 1950, the three documents (1910*a*, 1910*b*, 1910*c*) are overlaid in a manner such that the document boundaries are aligned. The respective DSM is shown in 1970, where the different gray levels of 1980 can indicate different possible locations for the targets. The DSM of 1970 also indicates two different axes (1985 and 1990), so that possible locations of a target can be used on other documents in a systematic manner (e.g., using its relative position on an x and y axis). For example, for a "total amount" target on invoices, it can be determined that the position along the 1985 axis can more reliable than along the 1990 axis. This type of information can be taken into account as a secondary criterion for the sorting of the potential candidates for a target during extraction.

FIG., 18 illustrates details related to applying the DSM in 1630, according to one embodiment. In 1810, the DSM is overlaid onto the document where a target is to be localized. In 1820, the possible position(s) of the target (along with the probability for each possible position) is obtained from the DSM. In 1830, these possible positions can be sorted so that the position with the highest probability can be deemed to be the position of the target. Once the position of the target is determined, information about the target (e.g., an amount listed in the "total amount" field) can be found.

Fuzzy Format Engines

Fuzzy format engines can collect a list of fuzzy formats for at least one target from training documents. During the extraction phase, the fuzzy format engine can calculate a score for the matching of the learned formats to the potential target. For example, given the target value "102.65$" for an amount type target, the fuzzy format engine could learn from the training documents that, in the representation "ddd.ddR", d represents digit and R represents a currency signal. If the fuzzy format engine then finds a string "876.27$", then this string can be determined to be a potential target value with a very high score (e.g., 10). However, if the string "1872,12$" is found, the score could be reduced by one for the additional digit, and reduced by another one for the comma instead of the period, for a score of 8. As another example, a fuzzy format engine could learn that "INVNR-10234" could be represented as "CCCC-ddddd", where C represents capital characters and d represents digits. Those of ordinary skill will see that many type of fuzzy format engines can be used, and there can also be many types of scoring utilized. Examples of other possible scoring systems are, for example: the different handling of missing or additional characters and digits (e.g., having a 0.125 score penalty per missing or additional character vs. a 0.25 penalty for a missing or additional digit); character string similarity measures that can be obtained as described in the following patent application/patents, which are herein incorporated by reference: US 2009/0193022, U.S. Pat. Nos. 6,983,345, and 7,433,997 (all entitled "Associative Memory").

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for determining at least one location of at least one target in at least one document, comprising:
   creating, utilizing at least one localization module and at least one processor, information compiled from at least one training document, the information comprising at least one reference and at least one reference vector tying each reference to the at least one target, wherein the creating further comprises:
      finding, utilizing the at least one localization module, the at least one reference;
      creating, utilizing the at least one localization module, the at least one reference vector for each reference;
      performing variance filtering, utilizing the at least one localization module, on the at least one reference and the at least one reference vector from each document to obtain any similar references and any similar reference vectors from all documents; and
      using any similar references and any similar reference vectors, utilizing the at least one localization module, to create at least one dynamic variance network (DVN), the at least one DVN comprising at least one reference and at least one reference vector tying each reference to the at least one target;
   comparing, utilizing the at least one localization module, the at least one reference to at least one new reference in at least one new document to determine if there are any similar references that are the at least one target, wherein similar references are: position similar, or type similar, or both; and wherein when the at least one new reference comprises at least one typo, at least one optical character recognition (OCR) mistake, or both, the at least one new reference is still determined to be the at least one target because of the at least one new reference's location; and
   applying the information, utilizing the at least one localization module, on at least one new document to determine at least one location of the at least one target on the at least one new document, wherein the applying further comprises:
      comparing, utilizing the at least one localization module, any similar references to the at least one new reference on at least one new document to determine if there are any matching references; and
      using, utilizing the at least one localization module, any similar reference vectors corresponding to any matching references to determine the at least one target on the at least one new document.

2. The method of claim 1, wherein the at least one reference and/or the at least one new reference comprises:
   at least one character string,
   at least one word;
   at least one number;
   at least one alpha-numeric representation;
   at least one token;
   at least one blank space;
   at least one logo; or
   at least one text fragment; or
   any combination thereof.

3. The method of claim 1, wherein the at least one location of the at least one target is used to obtain information, or confirm information, or both, about the at least one target.

4. The method of claim 1, wherein similar reference vectors are also content similar.

5. The method of claim 1, wherein similarity across references and reference vectors is configurable.

6. The method of claim 5, wherein characteristics of the at least one reference are taken into account, the characteristics comprising: font; font size; or style; or any combination thereof.

7. The method of claim 1, wherein strict matching, or fuzzy matching, or both are utilized to match any similar references to the at least one new reference in the at least one new document.

8. The method of claim 1, wherein the at least one reference and/or the at least one new reference is: merged with at least one other reference; or split into at least two references; or both.

9. The method of Claim 1, wherein the at least one DVN is dynamically adapted during document processing.

10. The method of Claim 1, wherein the at least one DVN is used for:
   reference correction;
   document classification;
   page separation;
   recognition of document modification;
   document summarization; or
   document compression;
   or any combination thereof.

11. The method of claim 1, wherein when the at least one new reference comprises an alternate spelling, the at least one new reference is still used as a reference because of the at least one new reference's location.

12. A system for determining at least one location of at least one target in at least one document, comprising:
   at least one processor, wherein the at least one processor is configured for:
      creating, utilizing at least one localization module in communication with the at least one processor, information compiled from at least one training document, the information comprising at least one reference and at least one reference vector tying each reference to the at least one target, wherein the creating further comprises:
         finding, utilizing the at least one localization module, the at least one reference;
         creating, utilizing the at least one localization module, the at least one reference vector for each reference;
         performing variance filtering, utilizing the at least one localization module, on the at least one reference and the at least one reference vector from each document to obtain any similar references and any similar reference vectors from all documents; and
         using any similar references and any similar reference vectors, utilizing the at least one localization module, to create at least one dynamic variance network (DVN), the at least one DVN comprising at least one reference and at least one reference vector tying each reference to the at least one target;
      comparing, utilizing the at least one localization module, the at least one reference to at least one new reference in at least one new document to determine if there are any similar references that are possibly the at least one target, wherein similar references are: position similar, or type similar, or both; and wherein when the at least one new reference comprises at least one typo, at least one OCR mistake, or any combination thereof, the at least one new reference is determined to be the at least one target because of the at least one new reference's location; and applying the information, utilizing the at least one localization module, on at least one new document to determine at least one location of the at least one target on the at least one new document, wherein the applying further comprises:

comparing, utilizing the at least one localization module, any similar references to the at least one new reference on at least one new document to determine if there are any matching references; and using, utilizing the at least one localization module, any similar reference vectors corresponding to any matching references to determine the at least one target on the at least one new document.

13. The system of claim 12, wherein the at least one reference and/or the at least one new reference comprises:
at least one character string,
at least one word;
at least one number;
at least one alpha-numeric representation;
at least one token;
at least one blank space;
at least one logo; or
at least one text fragment; or
any combination thereof.

14. The system of claim 12, wherein the at least one location of the at least one target is used to obtain information, or confirm information, or both, about the target.

15. The system of claim 12, wherein similar reference vectors are also content similar.

16. The system of claim 12, wherein similarity across references and reference vectors is configurable.

17. The system of claim 16, wherein characteristics of the at least one reference are taken into account, the characteristics comprising: font; font size; or style; or any combination thereof.

18. The system of claim 12, wherein strict matching, or fuzzy matching, or both, are utilized to match any similar references to the at least one new reference in the at least one new document.

19. The system of claim 12, wherein the at least one reference and/or the at least one new reference is: merged with at least one other reference; or split into at least two references; or both.

20. The system of claim 12, wherein the at least one DVN is dynamically adapted during document processing.

21. The system of claim 12, wherein the at least one DVN is used for:
reference correction;
document classification;
page separation;
recognition of document modification;
document summarization; or
document compression;
or any combination thereof.

22. The system of claim 12, wherein when the at least one new reference comprises an alternate spelling, the at least one new reference is still used as a reference because of the at least one new reference's location.

* * * * *